(12) United States Patent
Brunson

(10) Patent No.: US 11,346,069 B2
(45) Date of Patent: May 31, 2022

(54) ANCHOR BOLT SETTER MECHANISM ASSEMBLY

(71) Applicant: Deron G Brunson, Draper, UT (US)

(72) Inventor: Deron G Brunson, Draper, UT (US)

( * ) Notice: Subject to any disclaimer, the term of this patent is extended or adjusted under 35 U.S.C. 154(b) by 256 days.

(21) Appl. No.: 16/840,324

(22) Filed: Apr. 4, 2020

(65) Prior Publication Data

US 2021/0172146 A1 Jun. 10, 2021

Related U.S. Application Data

(63) Continuation-in-part of application No. 16/678,487, filed on Dec. 7, 2019, now abandoned.

(51) Int. Cl.
*E02D 5/80* (2006.01)
*F16B 13/12* (2006.01)

(52) U.S. Cl.
CPC ............ *E02D 5/801* (2013.01); *F16B 13/124* (2013.01)

(58) Field of Classification Search
CPC ....... E04B 1/4107; E04B 1/4157; E02D 3/12; E02D 5/801; E04G 21/185; E21D 20/02; F16B 13/124
See application file for complete search history.

(56) References Cited

U.S. PATENT DOCUMENTS

| | | | | |
|---|---|---|---|---|
| 1,155,243 A | * | 9/1915 | Jordahl | E04B 1/4107 52/707 |
| 3,854,371 A | * | 12/1974 | Lamothe | F16B 37/145 138/96 T |
| 4,380,329 A | * | 4/1983 | Nunno | E04H 6/44 269/287 |
| 4,412,407 A | * | 11/1983 | Melfi | E04G 21/185 52/309.1 |
| 5,050,364 A | * | 9/1991 | Johnson | E04B 1/4157 D8/387 |
| 5,060,436 A | * | 10/1991 | Delgado, Jr. | B28B 23/005 52/699 |
| 5,337,534 A | * | 8/1994 | Nasca | E04G 21/185 52/699 |
| 7,487,597 B2 | * | 2/2009 | Diaz | E04B 1/4157 33/562 |
| 7,891,110 B2 | * | 2/2011 | Diaz | E04B 1/4157 33/562 |
| 8,544,814 B2 | * | 10/2013 | Diaz | E04B 1/4157 249/207 |

(Continued)

*Primary Examiner* — Edwin J Toledo-Duran
(74) *Attorney, Agent, or Firm* — Donald R Boys; Central Coast Patent Agency LLC

(57) ABSTRACT

An Anchor Bolt Setting (ABS) system has a bolt cap adapted to securely hold an anchor bolt vertically by an upper threaded end, with the anchor bolt suspended below the bolt cap, and an adapter having a first interface shaped to engage an edge of a foundation form for concrete, a substantially planar portion extending over the foundation form from the edge, and a second interface in the planar portion shaped to engage and suspend the bolt cap, with the anchor bolt suspended downward. The anchor bolt is threaded into the bolt cap, the adapter is engaged to the edge of the foundation form extending horizontally over the foundation form, the bolt cap with the anchor bolt engaged is engaged to the second interface of the adapter, presenting the anchor bolt downward into the foundation form, and uncured concrete is poured into the foundation form, enveloping the anchor bolt.

10 Claims, 17 Drawing Sheets

(56) References Cited

U.S. PATENT DOCUMENTS

| | | | | |
|---|---|---|---|---|
| 2005/0120666 A1* | 6/2005 | Alyea | ............. | E04B 1/4157 |
| | | | | 52/698 |
| 2007/0236023 A1* | 10/2007 | Beery | ............. | E04G 21/185 |
| | | | | 292/341.14 |
| 2010/0107546 A1* | 5/2010 | Diaz | ............. | E04G 21/185 |
| | | | | 29/401.1 |
| 2011/0131895 A1* | 6/2011 | Dempsey | ............. | A63B 63/004 |
| | | | | 52/157 |
| 2011/0308183 A1* | 12/2011 | Asada | ............. | F16M 5/00 |
| | | | | 52/414 |

* cited by examiner

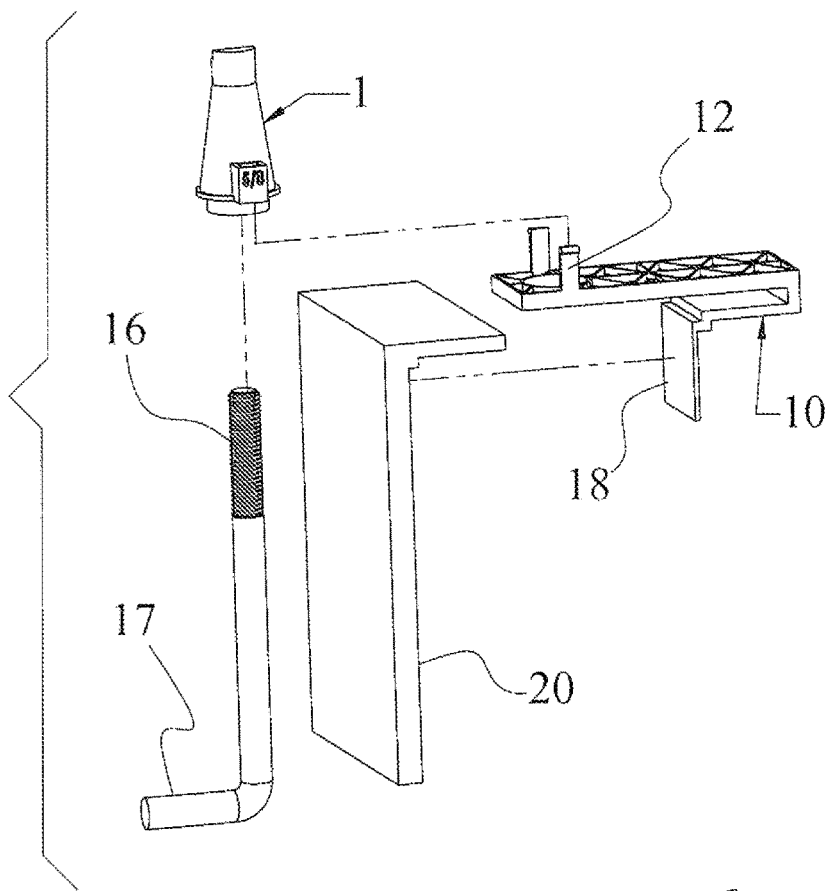
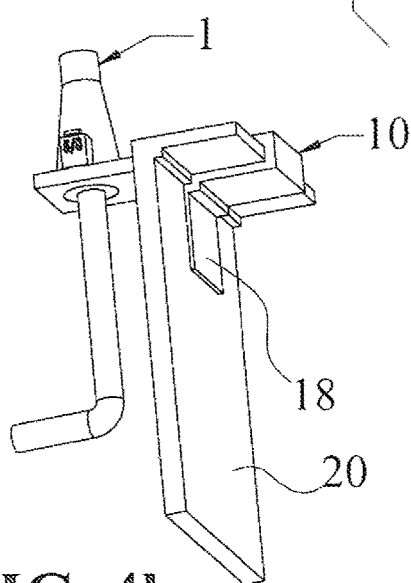
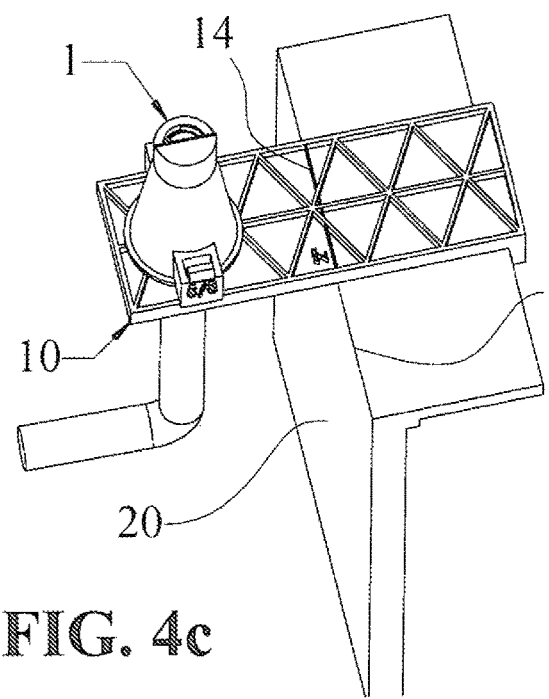
FIG. 4a
FIG. 4b
FIG. 4c

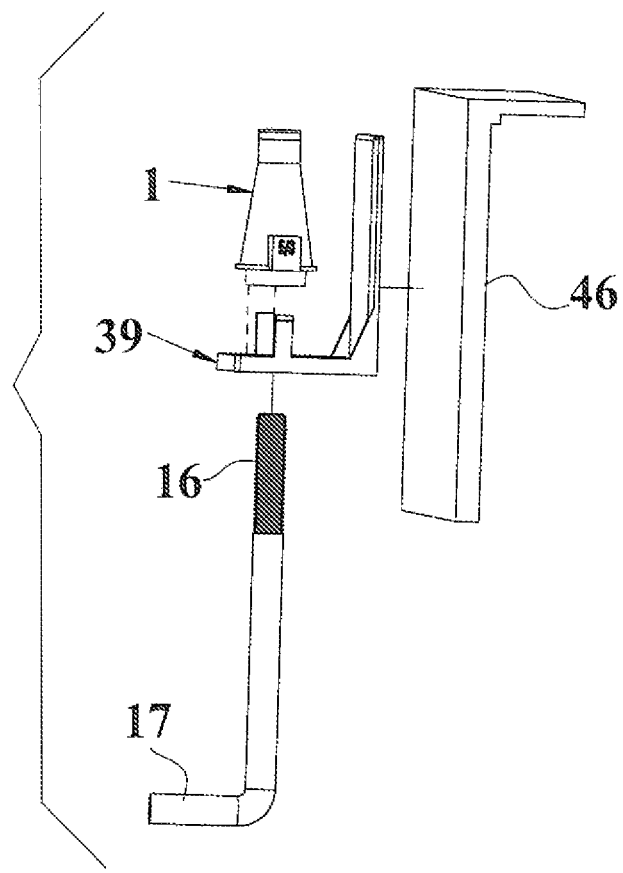
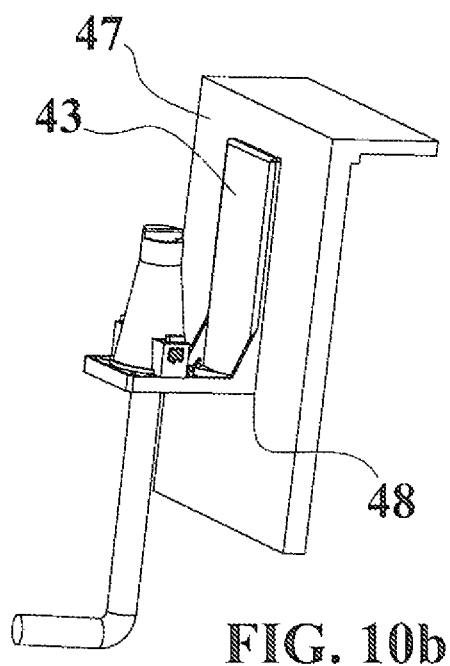

ANCHOR BOLT SETTER MECHANISM ASSEMBLY

CROSS-REFERENCE TO RELATED APPLICATIONS

This application is a continuation-in-part of U.S. patent application Ser. No. 16/678,487 filed on Nov. 8, 2019 and the benefit of this earlier filing date is claimed for all matter common therewith.

BACKGROUND OF THE INVENTION

Field of the Invention

The application of this invention, the Anchor Bolt Setter (ABS), relates to concrete construction, and more particularly to the setting of anchor bolts for concrete foundations and concrete slabs requiring the placement of anchor bolts. The ABS is an apparatus mechanism assembly that sets anchor bolts prior to the pouring of concrete into any type of foundation forms or slabs.

Discussion of the Related Technology

During the process of building homes or various other types of buildings, a footing is created with concrete. After this footing is created, foundation forms are placed onto the footing to create foundation walls which extrude upwards from the footings. Concrete is then poured into these foundation forms creating a foundation, once the concrete hardens, or cures, the foundation forms are then removed leaving behind the foundation walls. When anchor bolts are required, they must be placed prior to the concrete hardening and they are placed so that they set on top of the foundation walls. The anchor bolts must be placed in a manner that meets certain dimensions of how high, how low, what angle, and how far from the inside of the outer wall of the foundation or slab form they must set, while insuring that the threaded part of the anchor bolt protrudes from the top of the foundation, while the rest of the anchor bolt sets inside the concrete foundation. It's in the placement of the anchor bolts before the concrete is poured where this invention of the Anchor Bolt Setter comes into play. The Anchor Bolt Setter allows anchor bolts to be properly set to the required dimensions before the concrete is poured, and once the concrete is dry or is cured the Anchor Bolt Setter is then easily removed at the same time that the foundation forms and slab forms are removed, leaving behind a foundation slab with protruding anchor bolts.

Various mechanisms have been devised in one way or another that favor wet setting anchor bolts (wet setting anchor bolts is the method of pushing anchor bolts into wet cement and allowing it to dry that way). Wet setting anchor bolts is a practice this is widely and commonly used but discouraged by The Structural Engineer's Association of Utah ("SEAU") who published a letter in this regard against wet setting anchor bolts pursuant to the IBC (International Building Code) Sections 1912, 1704.4, 1704.13, 109.3.1, 109.3.2. The applicable parts of this letter can be seen at http://www.kimballeng.blogspot.com/209/11/wet-setting-anchor-boltsholdowns.html). Wet setting methods fail to address the setting of anchor bolts before the concrete is poured, also they are designed only for one type of concrete foundation forms, and they have no application when the concrete is not poured to the top of the concrete foundation forms, and they do not address setting the anchor bolt to accommodate concrete slabs.

BRIEF SUMMARY OF THE INVENTION

In one embodiment of the invention an Anchor Bolt Setting (ABS) system comprises a bolt cap adapted to securely hold an anchor bolt vertically by an upper threaded end, with the anchor bolt suspended below the bolt cap, and an adapter having a first interface shaped to engage an edge of a foundation form for concrete, a substantially planar portion extending over the foundation form from the edge, and a second interface in the planar portion shaped to engage and suspend the bolt cap, with the anchor bolt suspended downward. The anchor bolt is threaded into the bolt cap, the adapter is engaged to the edge of the foundation form extending horizontally from the inside of the outer walls of the foundation form, the bolt cap with the anchor bolt engaged is engaged to the second interface of the adapter, presenting the anchor bolt downward into the foundation form, and uncured concrete is poured into the foundation form, enveloping the anchor bolt.

In one embodiment the substantially planar portion has a dimension mark by which a user, in engaging the adapter to the foundation form, may position the bolt cap with the anchor bolt positioned a specific dimension from the edge of the foundation form. Also, in the embodiment the specific dimension is two inches. In one embodiment the bolt cap has a substantially conical shape around a vertically-oriented axis, the apex upward, and a cylindrical extension at a lower most extremity, and the second interface is a circular opening through the planar portion with an axis orthogonal to the plane of the planar portion, and diametrically opposed clips adapted to engage the bolt cap, such that the bolt cap securely engages the circular opening, suspending the anchor bolt vertically below the bolt cap. And in one embodiment the system further comprises a lock tie with downward-extending clips adapted to lock the lock tie to the adapter from above, and the bolt cap has a lateral projection engaged by the lock tie, securing the bolt cap to the adapter.

In one embodiment of the system the bolt cap has a shape, height and thread size corresponding to a specific anchor bolt. Also, in one embodiment of the system the specific anchor bolt is specified on a surface of the bolt cap by indicia. In one embodiment the adapter has a slot shaped to slide over a lip of a steel foundation form, presenting the substantially planar extension horizontally over the foundation form. In one embodiment the adapter is shaped to engage a lip of a wooden foundation form and is nailed or stapled to the wood foundation form. And in one embodiment the adapter is shaped with a vertically oriented surface that is secured to an inside vertical surface of the foundation form, for forms that are not filled to at or near the top of the form.

In another aspect of the invention a method for setting an anchor bolt in poured concrete is provided, comprising engaging an adapter to an edge of a foundation form, the adapter having a first interface shaped to engage an edge of the foundation form, a substantially planar portion extending over the foundation form from the edge, and a second interface in the planar portion shaped to engage and suspend a bolt cap, threading an anchor bolt into the bolt cap by an internal thread in the bolt cap, engaging the bolt cap in the second interface secured by upwardly extending clips from the adapter at the second interface, adapted to engage and hold the bolt cap, and pouring wet concrete into the foundation form, enveloping a lower portion of the anchor bolt.

In one embodiment of the method the substantially planar portion has a dimension mark by which a user, in engaging the adapter to the foundation form, positions the bolt cap with the anchor bolt positioned a specific dimension from the edge of the foundation form. Also in one embodiment the specific dimension is two inches. In one embodiment the bolt cap has a substantially conical shape around a vertically-oriented axis, the apex upward, and a cylindrical extension at a lowermost extremity, and the second interface is a circular opening through the planar portion with an axis orthogonal to the plane of the planar portion, and diametrically opposed clips adapted to engage the bolt cap, wherein a user engages the bolt cap into the second interface such that the bolt cap securely engages the circular opening, suspending the anchor bolt vertically below the bolt cap. And in one embodiment the method further comprises engaging a lock tie to the adapter with downward-extending clips on the lock tie adapted to lock the lock tie to the adapter from above, capturing the bolt cap by a lateral projection engaged by the lock tie, securing the bolt cap to the adapter.

In one embodiment the bolt cap has a shape, height and thread size corresponding to a specific anchor bolt, and the specific anchor bolt is threaded into the bolt cap. Also, in one embodiment the specific anchor bolt is specified on a surface of the bolt cap by indicia. In one embodiment the adapter is assembled to a steel foundation form by a slot shaped to slide over a lip of a steel foundation form, presenting the substantially planar extension horizontally over the foundation form. In one embodiment the adapter is assembled to a wooden foundation form by a slot shaped to engage a lip of the wooden foundation form and is nailed to the wood foundation form. And in one embodiment the adapter is shaped with a vertically oriented surface that is secured to an inside vertical surface of the foundation form, for forms that are not filled to at or near the top of the form.

BRIEF DESCRIPTION OF THE DRAWINGS

FIGS. 4a, 4b and 4c illustrates how the ABS Steel Slider mounts against the industry standard steel frame foundation forms. The several different views show two parts of the ABS consisting of the ⅝" ABS Bolt Cap and the ABS Steel Slider. The illustrations also identifies a typical anchor bolt along with a small partial brief sketch of a typical industrial steel frame foundation form, the different views show how all the items work together and how the ABS is set into place as identified and explained by the referenced numbered lead lines.

FIGS. 10a and 10b illustrate how the ABS fits against any foundation forms when the concrete is not poured to the top. The different views show two parts of the ABS consisting of the ⅝" ABS Bolt Cap and the ABS Elbow. The illustrations also shows a small partial brief sketch representing the side of any foundation forms and an anchor bolt, and the different views show how all the items work together and how the ABS is set into place as explained and identified by the referenced numbered lead lines.

DETAILED DESCRIPTION OF THE INVENTION

Figure 1A:
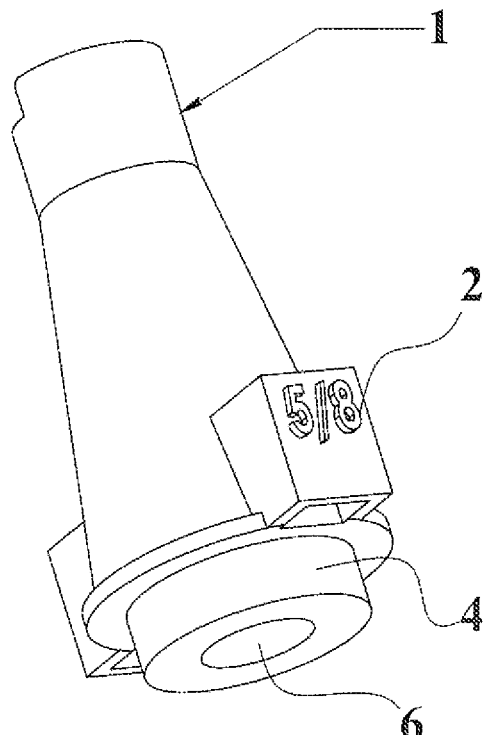
FIGS. 1a, 1b, 1c and 1d illustrate ⅝ inch ABS Anchor Bolt Caps consisting of several different views found in each figure, it is a representative of the different sizes of ABS Bolt Caps for short anchor bolts with different threaded sizes, and the numbered lead lines refer to explanations of its function and or purpose and identification.

The various embodiments and variations illustrated in the accompanying figures described herein are merely exemplary of the various embodiments and are not meant to be limiting in scope of the ABS's purpose and functions. It is to be appreciated that numerous variations of the invention have been contemplated as would be obvious to one of ordinary skill in the art with the benefit of this disclosure. Rather, the scope and breadth afforded this document should not only be limited by the claims provided herein while applying either the plain meaning found in the claims or the meaning clearly and unambiguously provided in this specification and drawings.

The following descriptions in some cases are given in an instruction style on setting up the ABS along with a description of each of the ABS mechanisms. In this manner the reader, or one whom is skilled in the art, may be given a better understanding of the invention, its purposes and functions. And as references there are brief limited illustrations consisting mostly of the inside of the various foundation forms which are given to demonstrate how the ABS is attached to the various foundation forms. Also, a limited illustration of the anchor bolt is also given to show how it installs into the ABS Bolt Caps. With these descriptions and illustrations, a person who has a basic understanding of the art will understand how the ABS sets and suspends the anchor bolt prior to the concrete being poured into foundation forms and or slabs.

Concrete foundation forms are used for the creation of concrete foundations for homes and various buildings. There are different types of foundation forms found in the industry. The different types include a steel framed foundation form, which is described as a steel frame wrapped around wood walls that come in different sizes. There are wood foundation forms formulated to a certain size which also come in different sizes. There are also custom-made wood foundation forms usually built by private builders for their own buildings. When these forms are set and ready for concrete, concrete is then poured into these forms to create the foundation, it might be noted that not always is the concrete poured to the top of these forms. Nonetheless, just before the pouring of the concrete is to take place the Anchor Bolt Setter (ABS) is an apparatus mechanism assembly used to set the required anchor bolts in its proper position before the concrete is poured, this eliminates the practice of wet setting anchor bolts that the IBC frowns upon. The ABS apparatus mechanism assembly fits the different types of commonly used concrete foundation forms and slab forms found in the industry, and the ABS is also formulated to be used when the concrete is not poured to the top of the any foundation forms.

The ABS consists of several different types of adapters, herein termed ABS Sliders, ABS Slider-Rs, ABS Elbows, ABS Elbow-Rs (The "R" at the end of each unit suggest it can be reused but requires a Lock Tie while the other ones cannot be re-used and do not require the Lock Tie). Each of the different ABS Sliders as adapters correspond with different styles of foundations forms when concrete is poured to or close to the top of these forms. For example, the industry standard steel frame forms would require the ABS Steel Slider or Steel Slider-R, the industry standard wood frame would require the ABS Wood Slider, or the ABS Custom Slider, or the ABS Wood Slider-R. All the custom-made wood foundation forms would require the ABS Custom Slider or the ABS Wood Slider-R. Anytime that concrete is not poured to the top of any type of foundation form it would require the ABS Elbow, or the ABS Elbow-R, or the ABS Universal Slider-R. The Sliders and Slider-R's are different. The Sliders allow the ABS Bolt Caps to be self-locked onto the Sliders, the Slider-R's are re-usable and are not self-locking but are designed with a receiver for the ABS Lock Tie to lock the ABS Bolt Caps into place on the Slider-R's. The Elbows are different too. The Elbows are self-locking while the Elbow-Rs are reusable and are not self-locking but are designed with a receiver for the ABS Bolt Cap to be locked down by the Lock Tie.

Before setting the anchor bolt it is first threaded into the ABS Bolt Cap that matches the same size of the anchor bolt. For example, the ½ inch anchor bolt would thread into a ½ inch Bolt Cap, the ⅝ inch anchor bolt would thread into a ⅝ inch Bolt Cap and so on. The threading of the anchor bolt is stopped when met with some resistance, stopping at a point when the bottom "L" shape of the anchor bolt protrudes in the same direction with one of the square shafts that protrudes form the side of the Anchor Bolt Cap. At this point the top of the anchor bolt should be seen through the half opening hole found on top of the Anchor Bolt Cap. When you can see the anchor bolt from the top of the Anchor Bolt Cap and the bottom "L" shape lines up and protrudes in the same direction of one of the square shafts of the Anchor Bolt Cap, this insures that the anchor bolt is properly secured into the ABS Bolt Cap.

Before placing the Anchor Bolt Cap, the ABS Sliders or ABS Elbows are placed into the corresponding foundation forms and stapled down. Stapling is much easier and faster than any other forms of fastening and is sufficient to withstand the forces of pouring concrete. Once the ABS is set into place, the ABS Bolt Cap with the anchor bolt is placed into the corresponding hole of the Slider or Elbow and self-locks into place, or is locked into place by the Lock Tie when using the Slider-R and Elbow-R, while making sure that the bottom of anchor bolt faces the other side of the forms.

The ABS is designed for easy take down at the time the foundation forms are to be taken down, and the ABS is then removed. The Lock Ties, when used, are removed by squeezing the sides of the bracket, which releases the bracket from its locking prongs, and then it is pulled upwards out of its socket and removed. When using the self-locking Sliders or Elbow self-locking stems are broken to remove the Bolt Cap and Slider or Elbow. Once the ABS Bracket is removed or the self-locking stems are broken, the ABS Bolt Cap is then un-threaded from the ABS Bolt Cap by a few turns, once it's off the anchor bolt the ABS Elbow or Slider is removed by first removing any staples, which cause the Elbow to fall off the foundation form, or in case of the Sliders they will slide off the foundation forms.

Figure 1B:
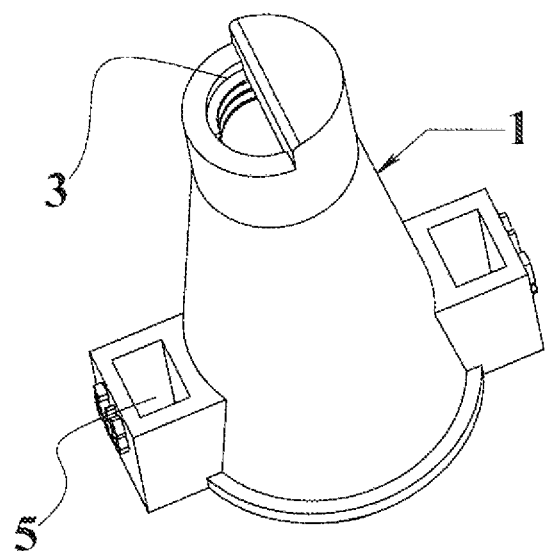
Figure 1C:
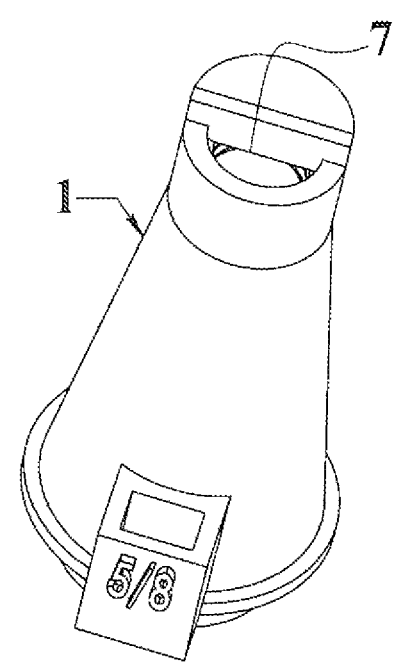
Figure 1D:
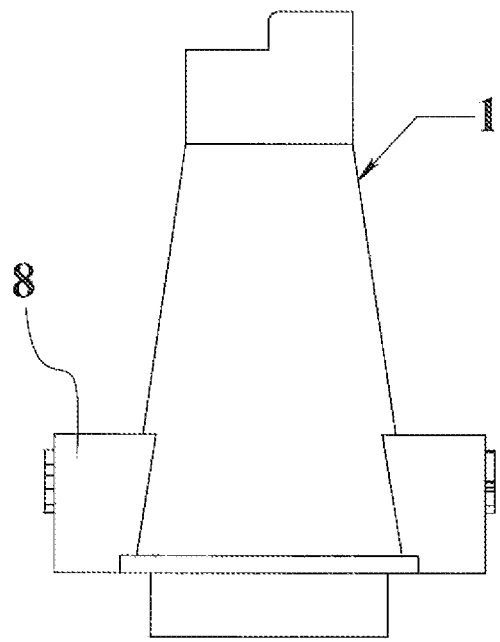
Figures 2A, 2B:
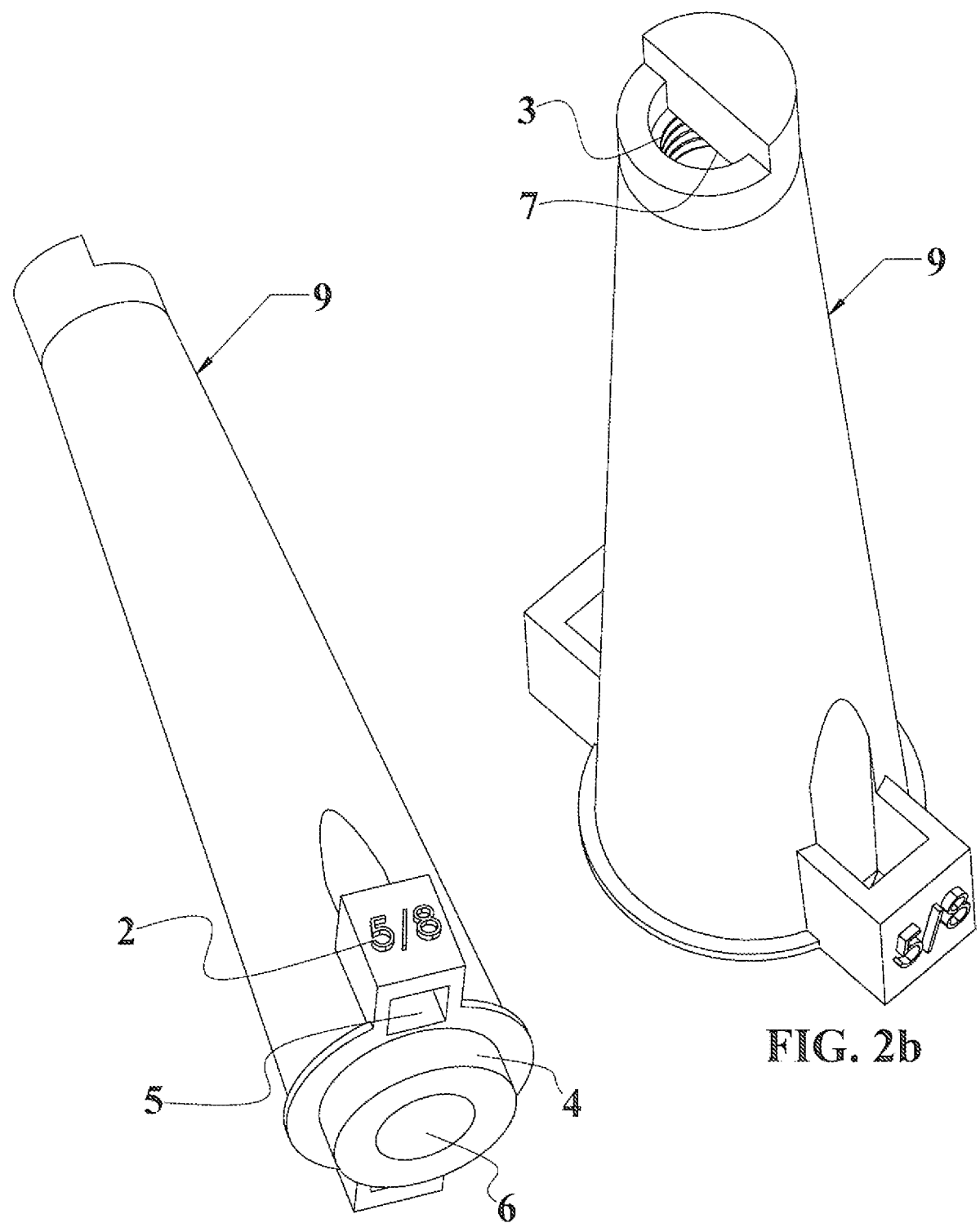
FIGS. 2a and 2b illustrate ⅝ inch Long ABS Anchor Bolt Cap, consisting of several different views, it is a representative of the different sizes of ABS Bolt Caps for long anchor bolts used mostly for the foundations and slabs, it has different threaded sizes, and the numbered lead lines refer to explanations of its function, identification and purpose.

The ABS Anchor Bolt Caps 1 and 9 ("Cap") are shown in FIGS. 1a-b and 2a-b. The Caps consist of elongated tubes that are hollow in the middle and are wider and thicker at the bottom than at the top. The top is capped half way across the top with a few inner threads to be seen close the top. The bottom in this embodiment has a lip that circulates around, protrudes from the tube, is positioned a little ways up from the bottom of the tube, and has of a specific thickness, and on the upper sides of this lip there are two rectangular boxes that are hollow and set opposite each other. On the sides of the rectangular boxes are written measurement sizes indicating what size of anchor bolt fits into the Caps. The figures represent two different lengths of the Cap. FIGS. 1*a-b* is that of a short Cap and FIGS. 2*a-b* is that of a long Cap. They are basically the same other than the length. The longer Cap is used for concrete slabs or when a longer anchor bolt is required. These Caps are interchangeable and produce the same functions. One whom has a basic understanding of the art will know which Cap to use with its corresponding anchor bolt.

On the sides of the Cap, represented by element #2, and against the rectangular hollow boxes is written ⅝. This represents the thread size of the anchor bolt 16 (FIG. 4*a*) that is placed inside the Cap at position 6, which would be a ⅝" anchor bolt. If the sides 2 were to read ½, then that would require a ½" anchor bolt. Caps 1 & 9 (FIGS. 1*a-b* and 2*a-b*) come in different sizes matching the different sizes of anchor bolts, and each different size of the Caps is made with a different color so that they are all color coded. For example, a white Cap would have the side 2 markings of ¼, a green Cap would have the side 2 markings of ½ and so on. Color coding is important, once the anchor bolts are set in place by the ABS assemblies, as different color of Caps will easily identify what size of anchor bolt is used in that specific spot. This becomes easy for inspectors to know if the right sized anchor bolts are set in place.

The Cap also has, in this example, two rectangle opening orifices 5 for attaching the Cap to the various ABS Sliders and Elbows as described below. The Cap also has a circular protrusion 4 at the bottom designed to fit inside holes 11 (FIGS. 3*a*, 3*c*, 12*a* and-12*b*), 25 (FIGS. 5*a*, 5*b*, 14*a*, 14*b* and 14*c*), 32 (FIGS. 7*a*, 7*b* and 7*c*), 42 (FIGS. 9*a*, 9*b*, 9*c*, 16*a*, 16*b*, and 16*c*) of the various ABS Sliders and Elbows as described below.

Anchor bolt 16 (FIG. 4*a*) installs inside cavity 6 found at the bottom of the Cap. Installation of the anchor bolt into the Cap is done by pushing the threaded part 16 (FIG. 4*a*) of the anchor bolt inside the cavity starting on the bottom at cavity 6, and then as the anchor bolt reaches the top 3 of the Cap the anchor bolt threads into the female threads near the top of the cap. Threading continues until the anchor bolt compresses against the end 7 of the Cap, stopping at the point when the bottom L shape 17 (FIG. 4*a*) of the anchor points outward from the middle of the sides 8 of the Cap. Once the anchor bolt is compressed into the cap (while making sure it is set at the right angle) this compression keeps the anchor bolt from turning from side to side while the concrete is being poured. After the cap is prepared, the process moves to a next step for each of the different types of foundation forms as described below.

Figure 3A:
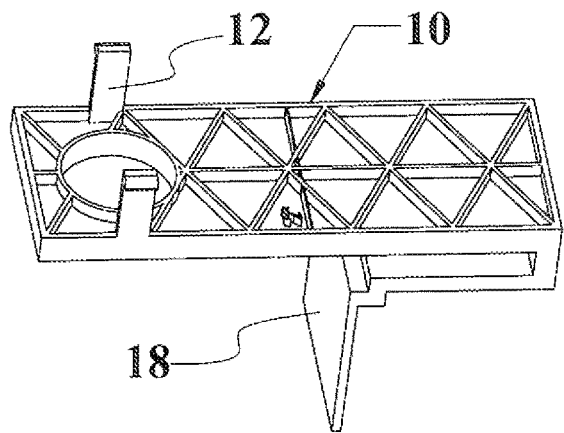
FIGS. 3a, 3b and 3c illustrate an ABS Steel Slider consisting of several different views found in each figure, this Steel Slider is designed for common industry standard steel foundation forms, and the numbered lead lines refer to explanations of its function, purpose and identification.
Figure 3B:
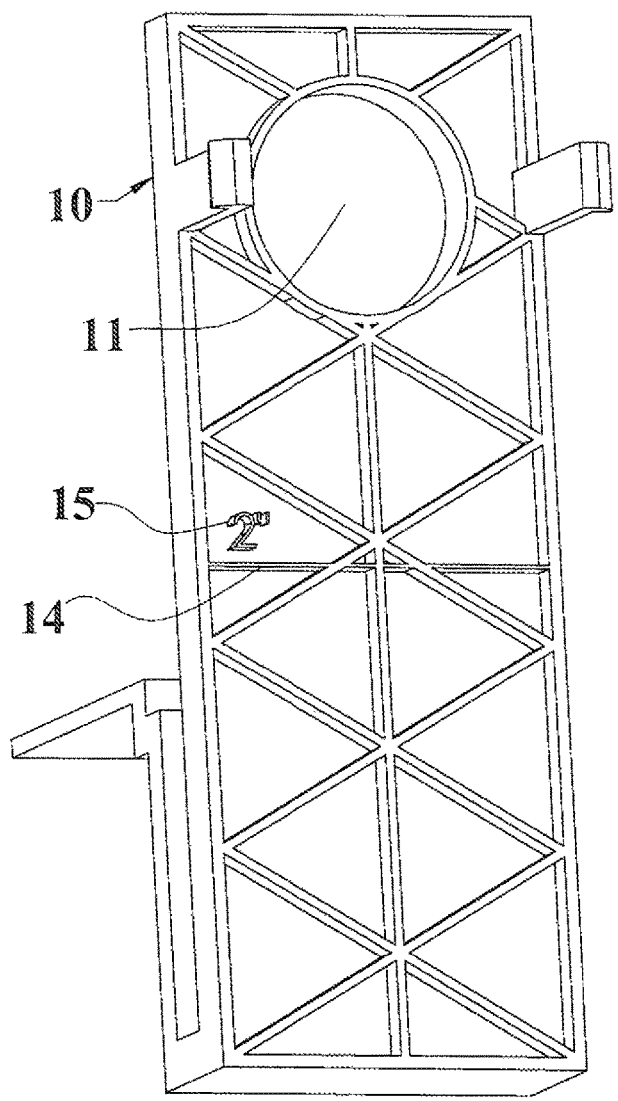
Figure 3C:
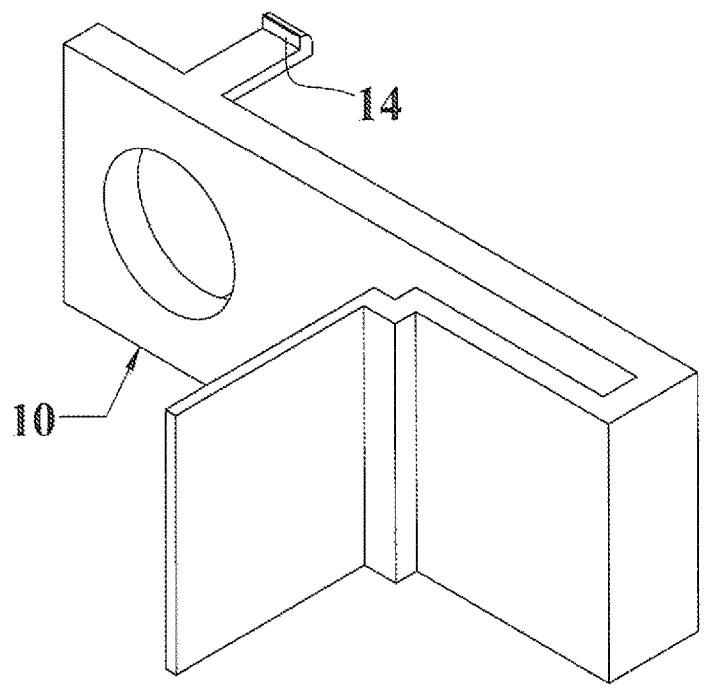

Industry standard steel foundation forms require the ABS Steel Slider ("Steel Slider") FIGS. 3*a-c* to be used. The Steel Slider is designed to fit or wrap around the steel foundation form 20 (FIG. 4*a*). The Steel Slider is flat and rectangular with several segments and angles (which is consistent with all the Sliders(-Rs) and designed with 2 prongs 12 that plug into the Cap 5. At the top of these prongs is designed a hook 13 that stops the anchor bolt from going upwards during the pouring of the concrete. This hook is found on all the prongs from all the ABS Sliders and Elbow. There is a 2" 15 (FIG. 3*b*) marker which identifies a marking line 14 as being 2" from the center of the hole 11. This indicates to the installer that the anchor bolt will be placed at the proper 2" from the outside side of the inside foundation form. This 2" indicator with its corresponding marking line is found on all the ABS Sliders, ABS Slider-Rs, Elbows and Elbow-Rs.

Installing the ABS Steel Slider is designed for an easy install FIGS. 4*a*, 4*b* and 4*c*. The lower tongue 18 part of the slider goes against the back side 20 of the Steel Slider where it maintains a nice snug fit while the installer is free to nail the tongue 18 down into the back side 20 of the Steel Slider. Once the Steel Slider is secured against the steel foundation form the next step is to install the Cap with the previous installed anchor bolt (as described above) onto the Steel Slider by placing the Cap 1 into the side prongs 12 so that you achieve an install as illustrated in FIGS. 4*a*, 4*b* and 4*c*. When the marker line 14 lines up with the edge of the foundation form 19 this indicates to the installer that the anchor bolt is 2" from the inside wall of the foundation form. Once the install as described above has been completed the anchor bolt is now set and is ready for the concrete to be poured.

Figure 5A:
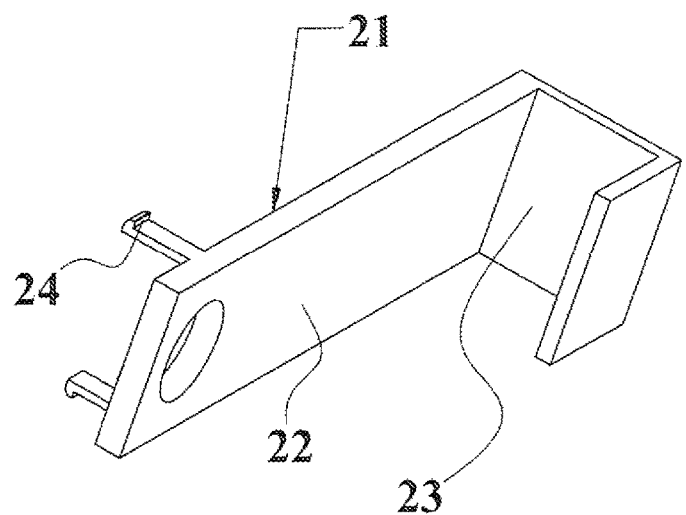
FIGS. 5a and 5b illustrates the ABS Wood Slider consisting of several different views, this Slider is designed for industry standard wood foundation forms, and the numbered lead lines refer to explanations of its function, purpose and identification.
Figure 5B:
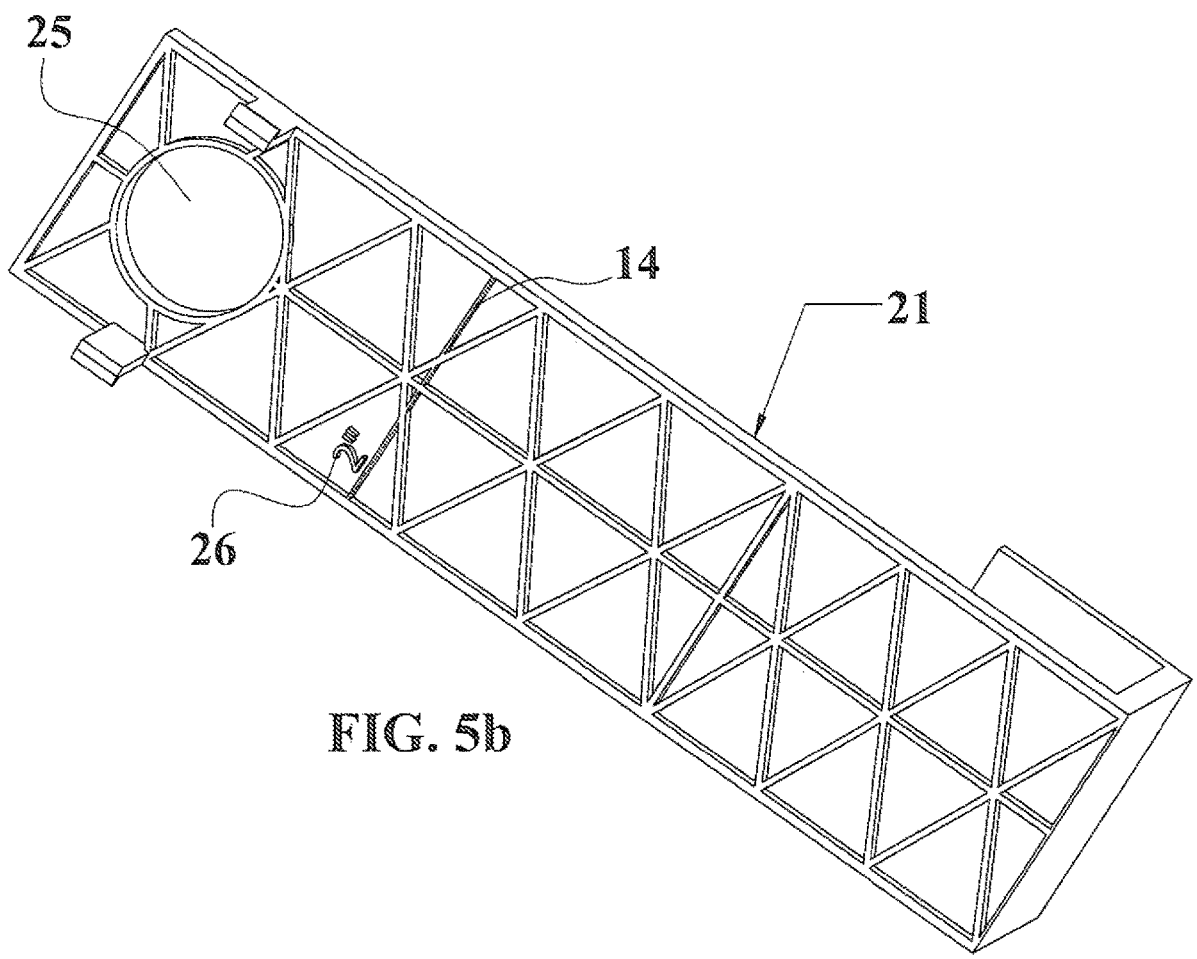

Industry standard wood foundation forms require the ABS Wood Slider ("Wood Slider") 21 (FIGS. 5*a* and 5*b*). Like the other Sliders this Slider also has the hole 25, prongs 24 and the 2" marker 26, this Wood Slider is rectangular and flat with several segments and angles and its back angles 23 designed to easily fit wood foundation forms, and the underside 22 is smooth.

Figure 6A:
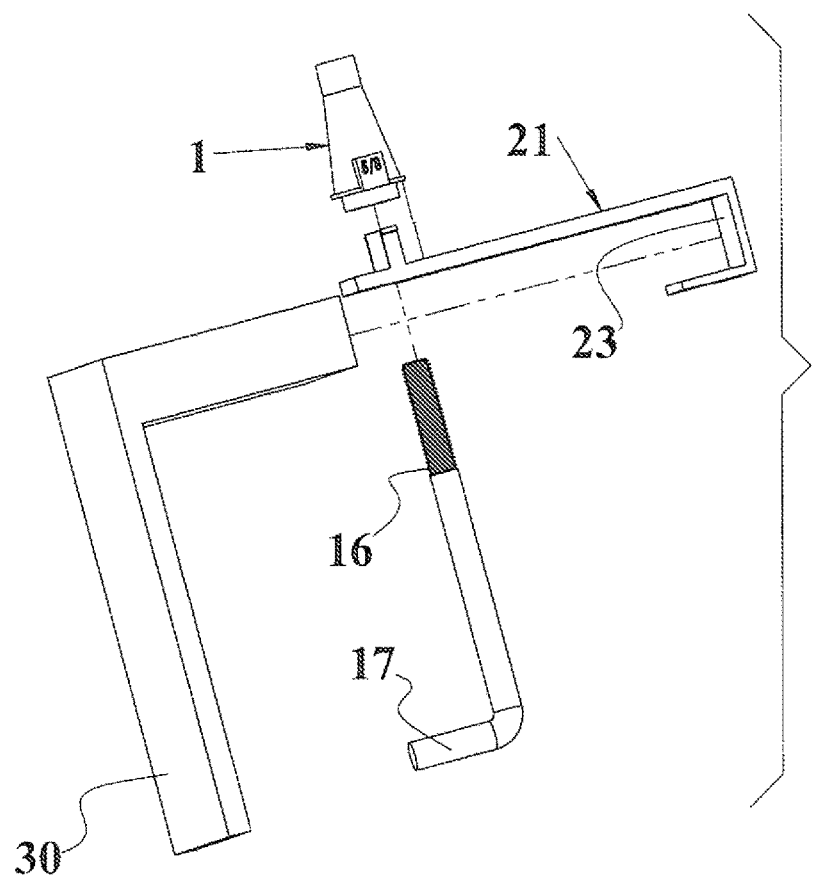
FIGS. 6a, 6b and 6c illustrates how the ABS mounts against the industry standard wood frame foundation forms. The several different views show two parts of the ABS consisting of the ⅝" ABS Bolt Cap and the ABS Wood Slider. The illustrations shows a typical anchor bolt along with small partial brief sketch of a typical industrial wood frame foundation form and a typical anchor bolt, and the views show how all the items work together and how the ABS is set into place as identified and explained by the referenced numbered lead lines.
Figure 6B:
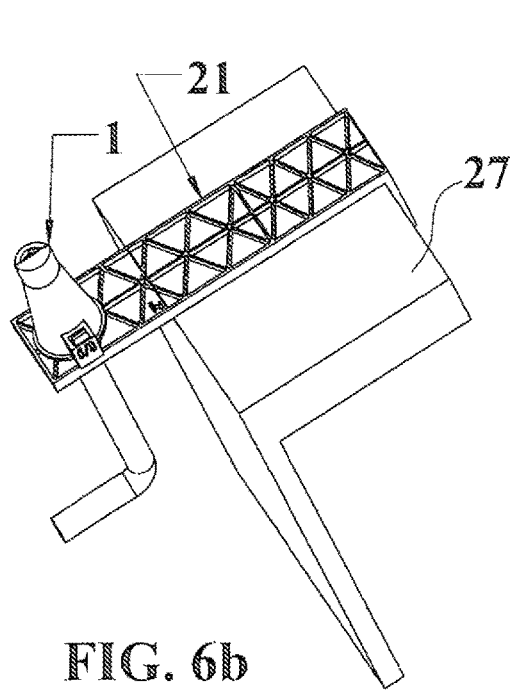
Figure 6C:
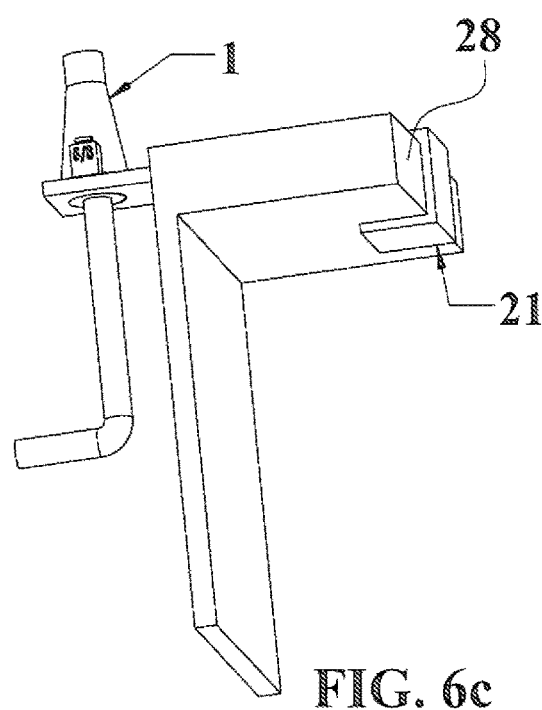

When installing the Wood Slider (See FIGS. 6*a*, 6*b* and 6*c*) onto the wood foundation form 30 the inside back part 23 of the angle sits tightly against the upper protruding part 28 of the wood foundation form. It then lays flat against the top 27 of the wood foundation form. To secure it more tightly, the Wood Slider is designed so that the installer can nail down the Wood Slider any place necessary. Once the Wood Slider is secured against the wood foundation form, the Cap with the previously installed anchor bolt is then installed onto the Wood Slider in the same manner and way that it is installed onto the Steel Slider. Once this is completed the anchor bolt is now set into place and ready for the concrete to be poured.

Figure 7A:
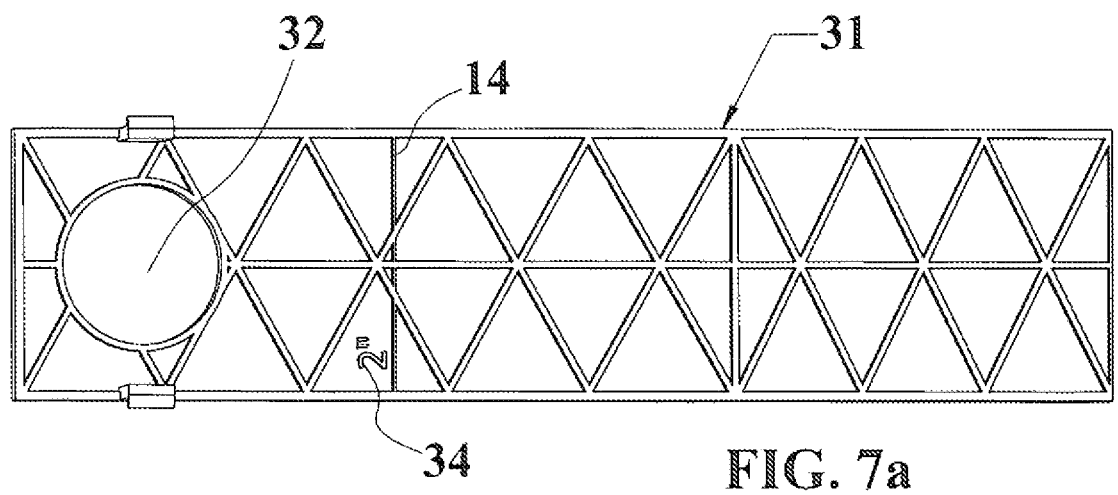
FIGS. 7a, 7b and 7c illustrates the ABS Custom Slider consisting of several different views, this Slider is designed for custom wood foundation forms, and the numbered lead lines refer to explanations of its function and purpose and identification.
Figure 7B:
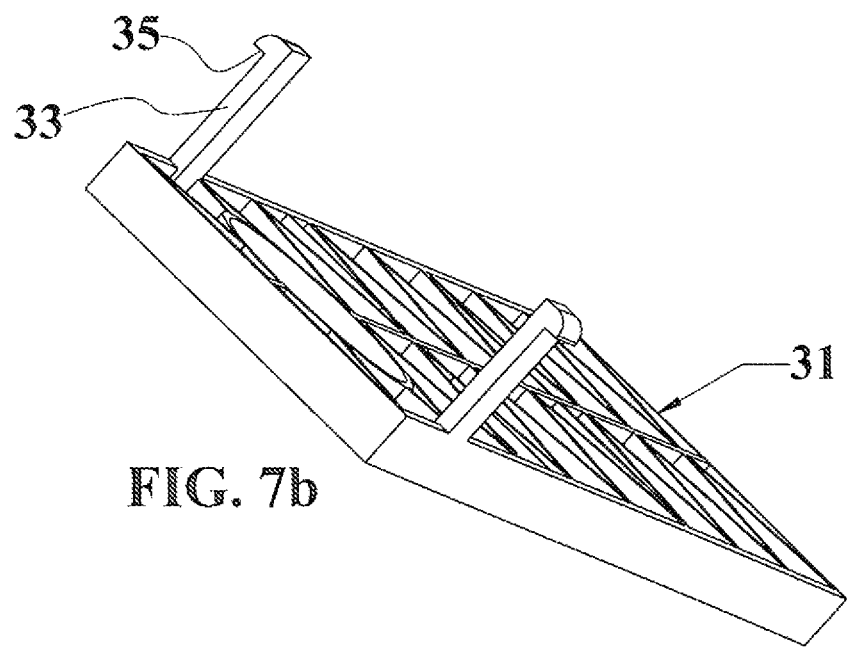
Figure 7C:
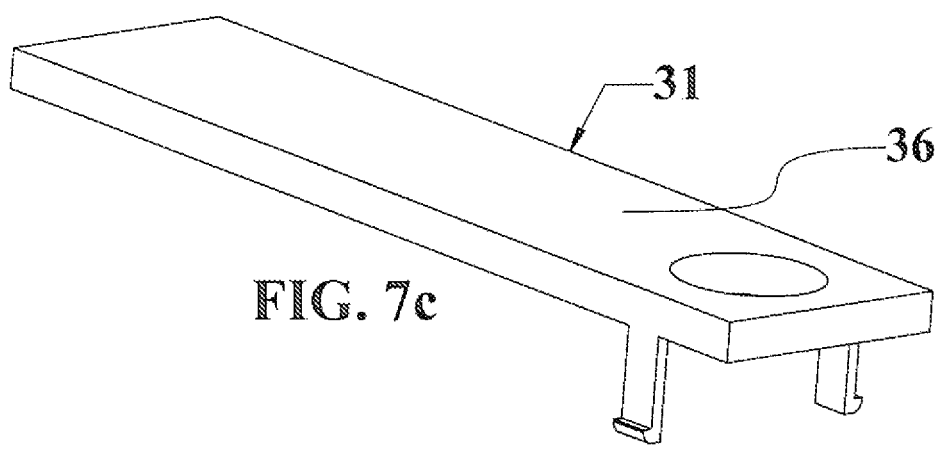

Custom-made wood foundation forms require the ABS Custom Slider ("Custom Slider") 31 (FIGS. 7*a*, 7*b* and 7*c*). The Custom Slider is designed with a 2" marking line 14. This line indicates the distance from the marking line to the center hole 32 of the Custom Slider. The slider also has 2 prongs 33. The Custom Slider is long enough to be used on any size custom wood foundation forms including industry standard wood foundation forms.

The Custom Slider is designed for custom wood foundation forms. The Custom Slider has similar features as the other two Sliders described above in that it has prongs 33 with a hook 35 at the end, a hole 32, a 2" marker line 14, and the bottom 36 is flat so that it can be placed on top of the custom wood foundation forms.

Figure 8A:
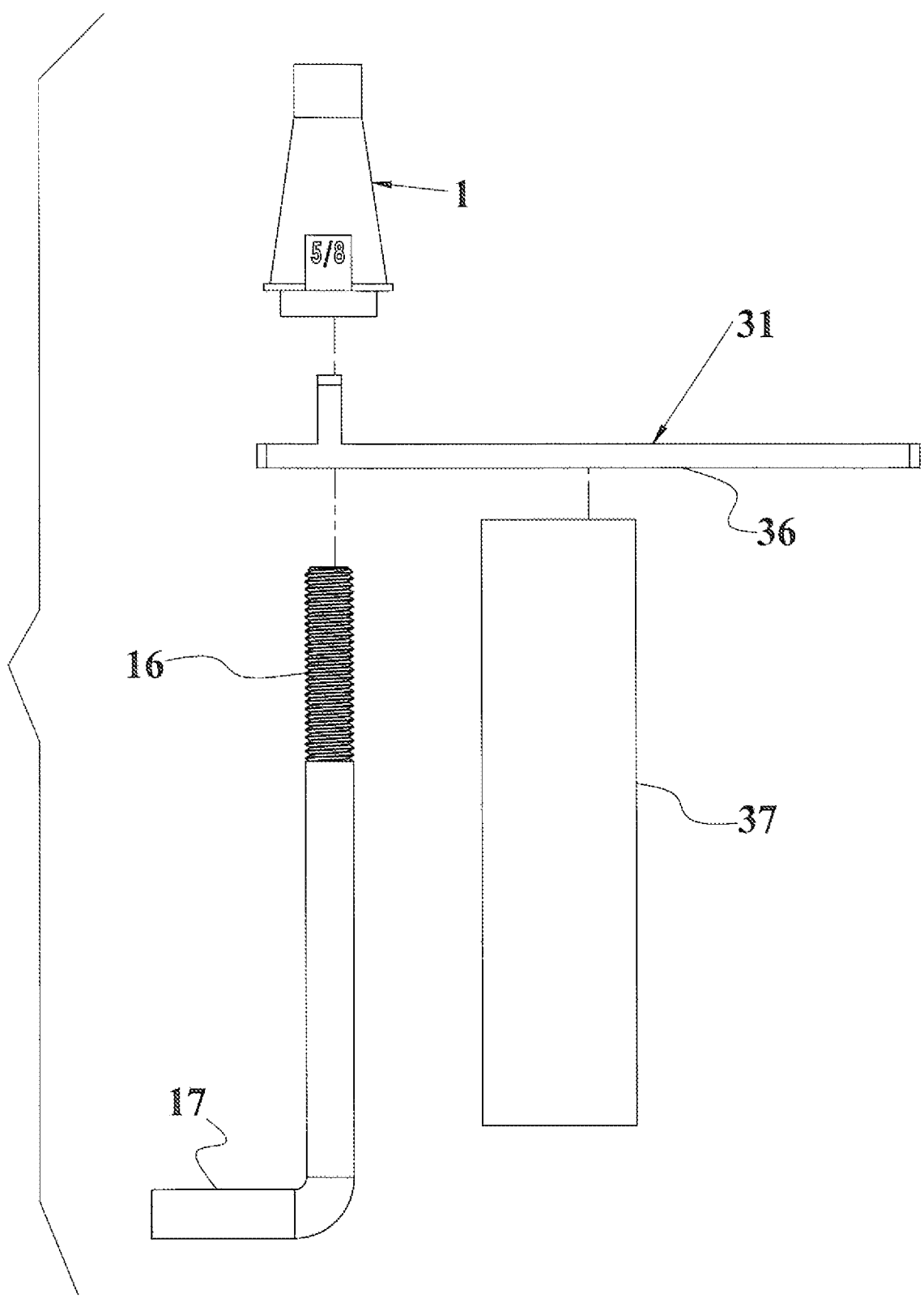
FIGS. 8a, 8b and 8c illustrate how the ABS mounts against custom wood frame foundation forms. The different views show two parts of the ABS consisting of the ⅝" ABS Bolt Cap and the ABS Custom Slider. The illustrations also shows a small partial brief sketch of a custom wood frame foundation form and an anchor bolt, and the different views show how all the items work together and how the ABS is set into place as explained and identified by the referenced numbered lead lines.
Figure 8B:
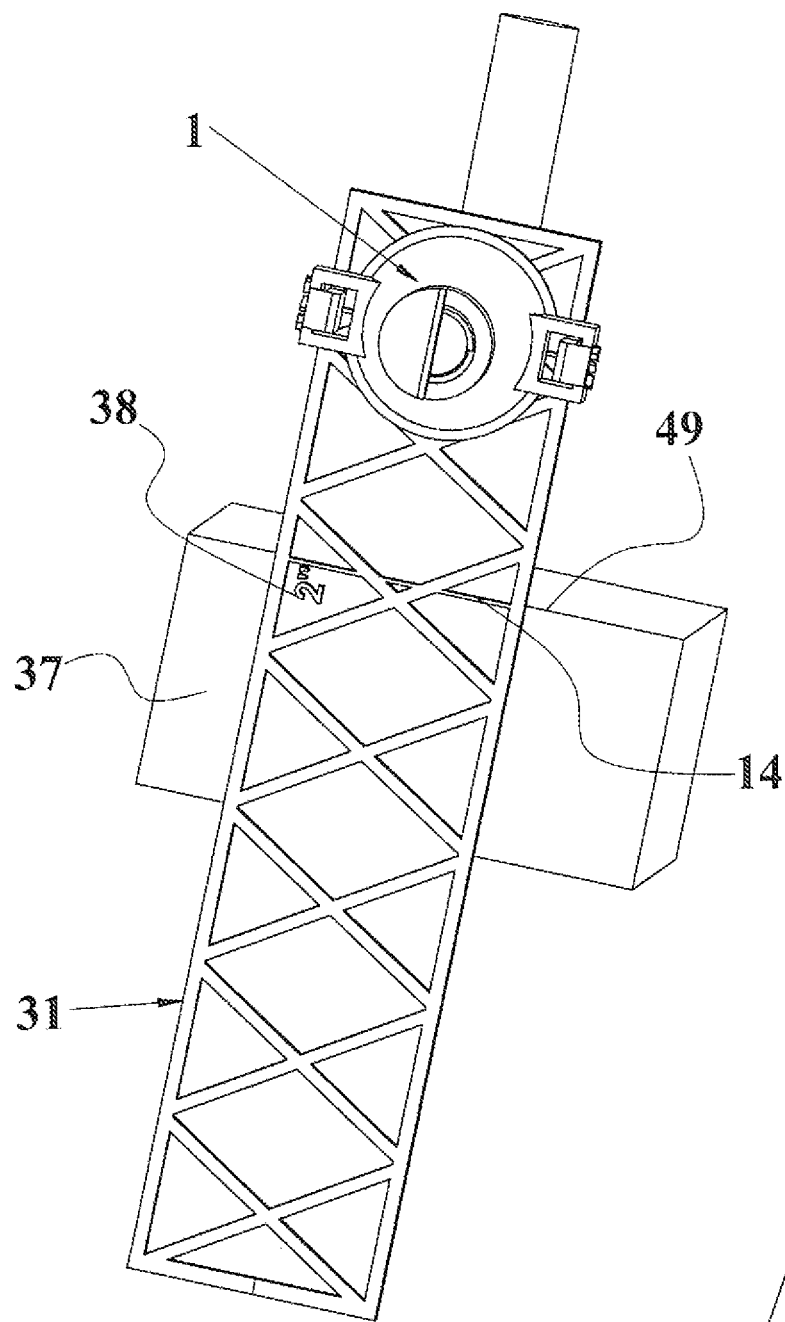
Figure 8C:
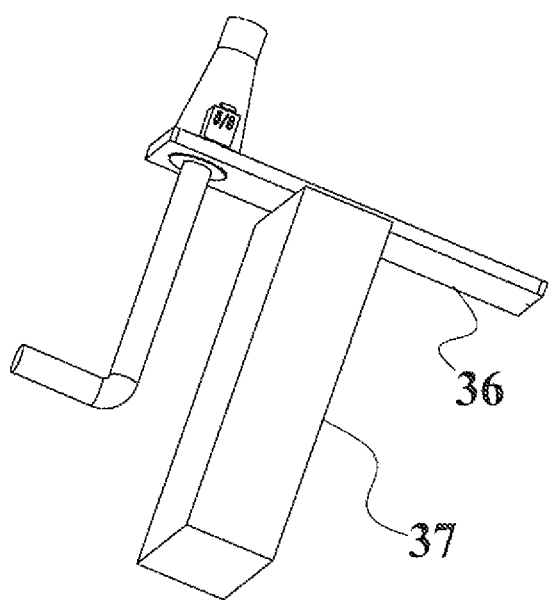
Figure 9A:
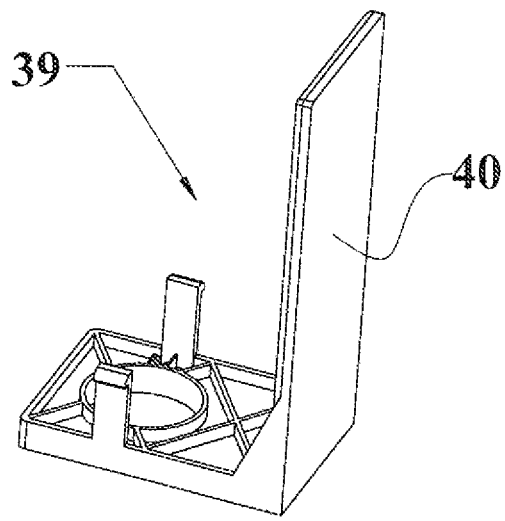
FIGS. 9a, 9b, 9c and 9d illustrate the ABS Elbow consisting of several different views, this Elbow is designed to be put into place against any foundation forms when the concrete is not poured to the top of the foundation forms, the numbered lead lines refer to its identification and explanations of its function and purpose.
Figure 9B:
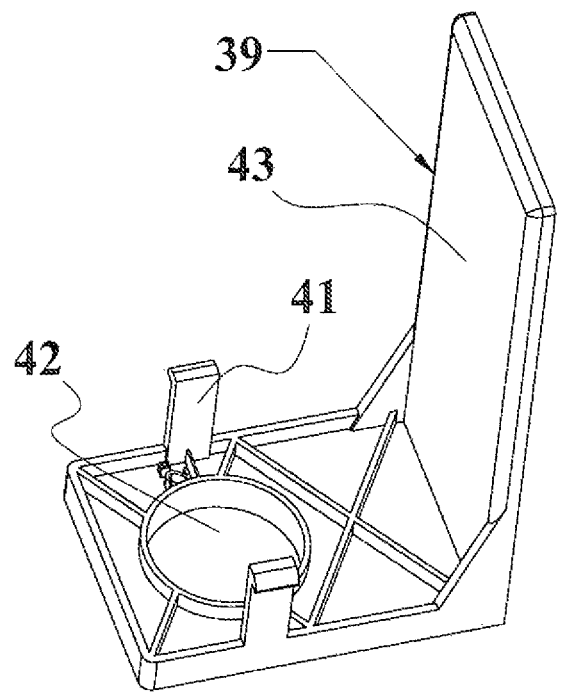
Figure 9C:
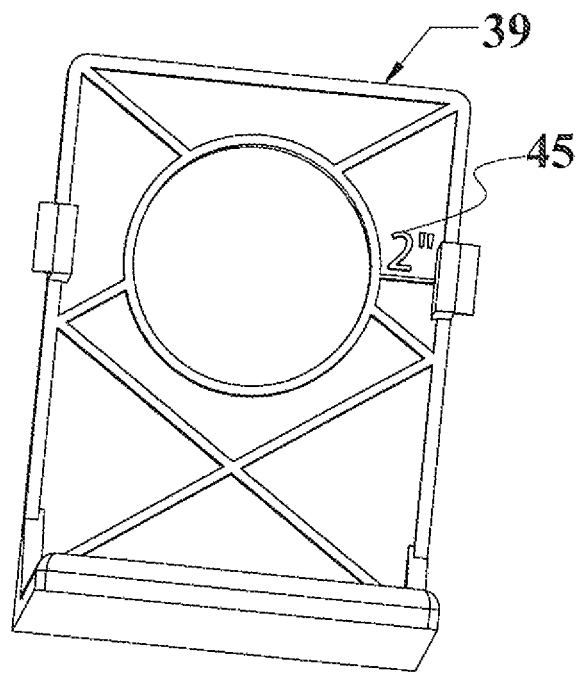
Figure 9D:
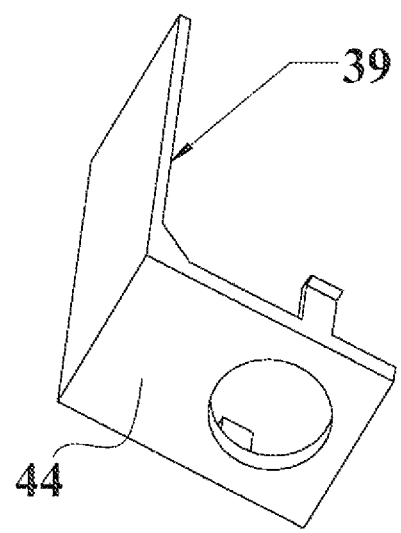

When installing the Custom Slider, as illustrated in FIGS. 8*a*, 8*b* and 8*c*, onto custom wood foundation forms, or any other type of wood forms, the 2" marking line 14 must line up along with the edge 49 of the foundation form as depicted in bottom drawing of FIGS. 8*a*, 8*b* and 8*c*. The installer is free to fasten the slider down anywhere necessary. Once it is fastened down and secured against the custom wood foundation form, the Cap with the previously installed anchor bolt is then placed onto the Custom Slider in the same manner that the Cap was described as being placed onto the Steel Slider. Once that is completed the anchor bolt is now securely set so that concrete can then be poured.

When concrete is not poured to the top of any foundation forms, then the ABS Elbow 39 (FIGS. 9*a*, 9*b*, 9*c* and 9*d*) is used. It is designed in like manner as the Sliders, with prongs 41, a hole 42 and a 2" marker 45 showing that it's 2" from the back of the foundation wall to the middle of the hole 42. The Elbow has an upper side 43 so that it can be secured against the foundation form.

When installing the Elbow onto the inside wall of any foundation form 46 (FIGS. 10*a* and 10*b*), the Elbow is placed along a chalk mark. Those knowledgeable in the art will have placed a chalk mark along the inside of the foundation form wall 47 identifying how high the concrete is to be poured. The upper back side 40 (FIG. 9*a*) is placed against the inside wall 47 of the form while the bottom edge 48 of the Elbow is lined up with the chalk mark (chalk mark is not shown in the illustration). The upper side 43 is nailed or stapled against the foundation form 47. Once the Elbow is secured against the wall of the form, the Cap with the anchor bolt is then installed onto the Elbow in the same fashion that the Cap is installed onto the Steel Slider. Once the steps are completed the anchor it set into position and is ready for the concrete to be poured. The manner in which the ABS may be uninstalled has already been described above.

The installer of the ABS System has a choice of using the re-usable Sliders-R's and Elbow-R, instead of the ones that are not re-usable.

Figure 11A:
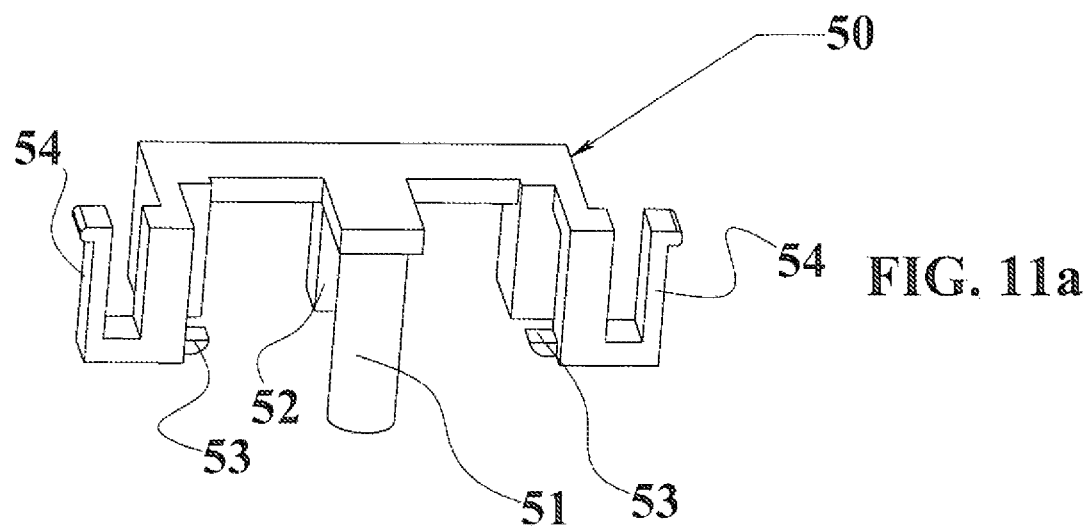
FIGS. 11a, 11b and 11c illustrates the ABS Lock Tie consisting of several different views, designed to be used with any of the Slider-R's and Elbow-R that have the lock down receivers so that they can be re-useable, its function is identified and explained by the referenced numbered lead lines.
Figure 11B:
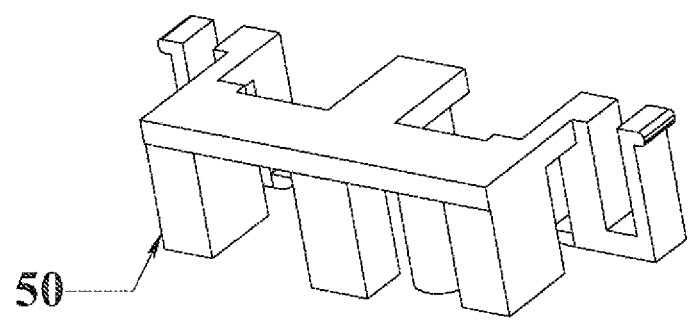
Figure 11C:
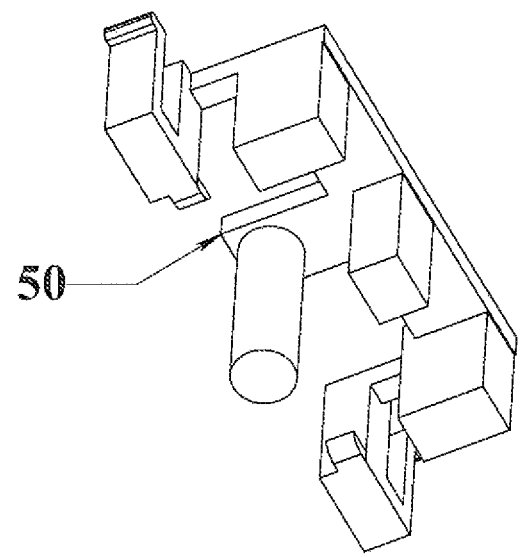

A Lock Down Tie 50 (FIGS. 11*a*, 11*b* and 11*c*) is shown from various angles. The Lock Tie is adapted to snap into place onto any of the Sliders-R's and Elbow-R with any of the corresponding ABS Bolt Caps. This Lock Tie secures the ABS Bolt Cap into place that has an anchor bolt screwed into it. In order for this to happen the Lock Tie is designed with a round protruding tube type tongue 51 (FIG. 11*a*) and a square protruding tube type tongue 52 along with two extruding small prongs 53 that correspond with the lock down receiver 56 of FIGS. 12*a* and 12*b*. The round tongue 51 plugs into the round orifice 57 of the receiver while the small two prongs plug into the two opening slots 59 (FIG. 12*b*). The square protruding tongue 52 plugs into one of the square open orifices 5 (FIG. 1*b*) found on all the ABS Bolt Caps. After an anchor bolt 17 is placed inside an ABS Bolt Cap, the Cap is then placed onto any one of the Sliders-R or Elbow-R, and then the Lock Tie is put into place. The different views of FIGS. 13*a*, 13*b* and 13*c* demonstrate how the Lock Tie sets into place for any receiver as described above. The process for removal of the ABS System after the concrete is poured is done by pressing the two arms 54 (FIG. 11*a*) towards each other which releases the two prongs 53 so that the Lock Tie can be pulled from its locked position as shown in FIG. 13*c*. Then the ABS Bolt Cap is unscrewed from the anchor bolt and the Slider-R or Elbow-R is released by removal of the staples or nails. The Sliders-R and Elbow-R are secured to the foundation forms in the same manner as the other Sliders and Elbow as described above.

Figure 12A:
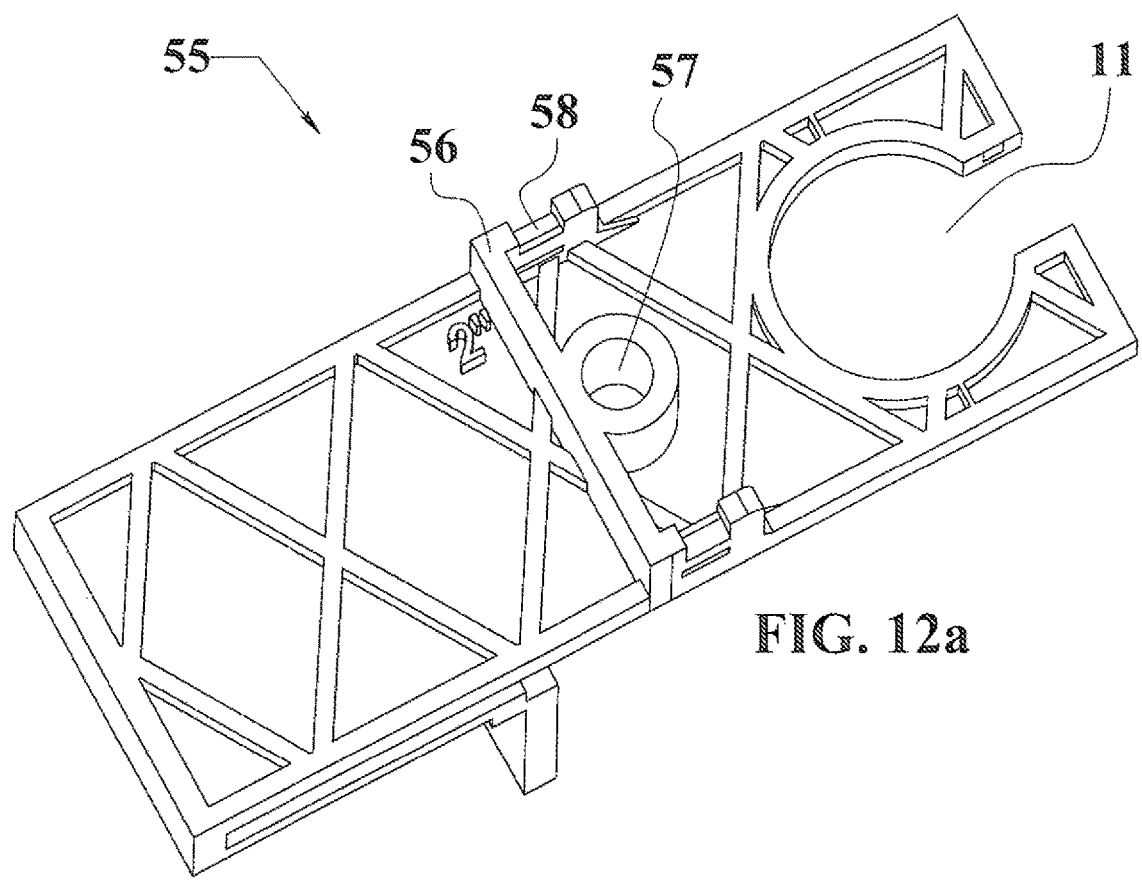
FIGS. 12a and 12b illustrate the ABS Steel Slider-R consisting of different views, similar to FIGS. 4a-c, designed without self-locking stems and designed with a receiver to accommodate the Lock Tie. It is reusable and its functions is identified and explained by the referenced numbered lead lines.
Figure 12B:
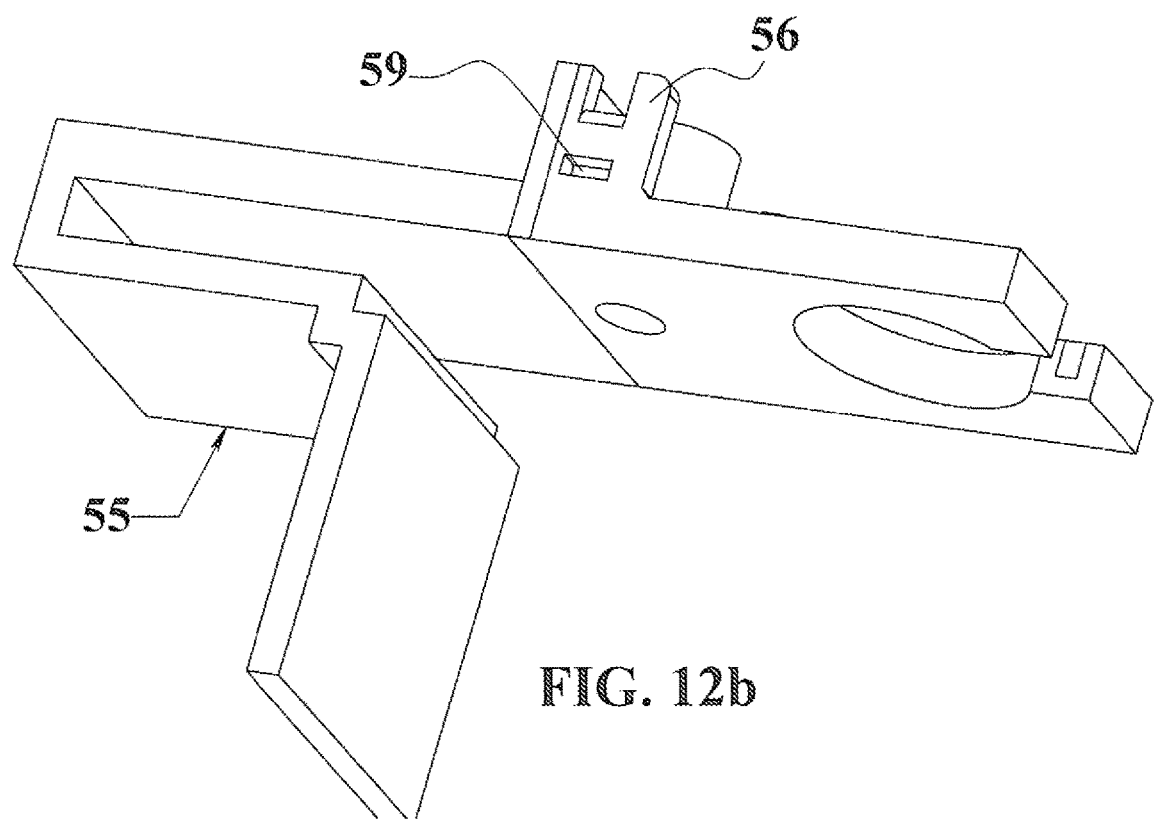
Figure 13A:
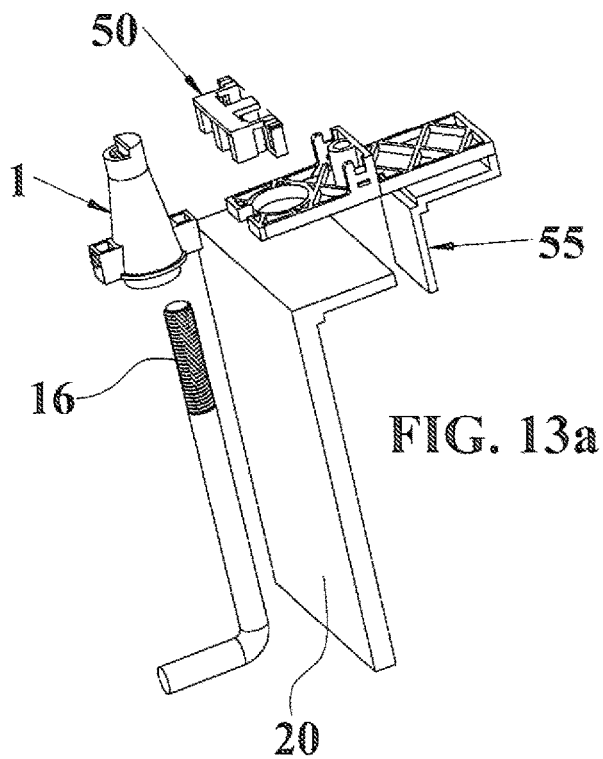
FIGS. 13a, 13b and 13c illustrate several different views of the ABS Steel Slider-R with the Lock Tie and an ABS Bolt Cap all in conjunction with each other. The different views show how they correlate with each other including its functions with numbered lead lines giving identification and information.
Figure 13B:
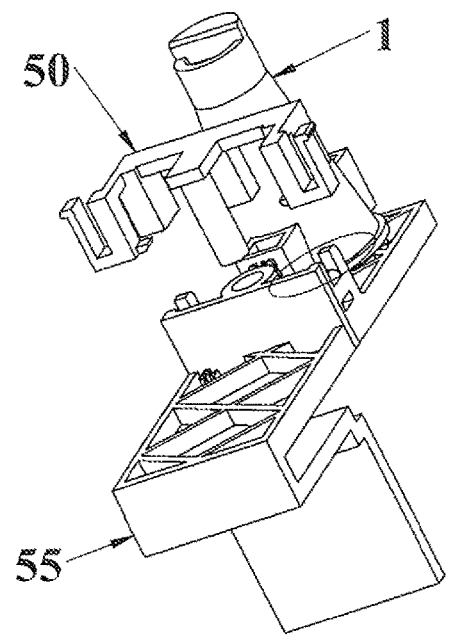
Figure 13C:
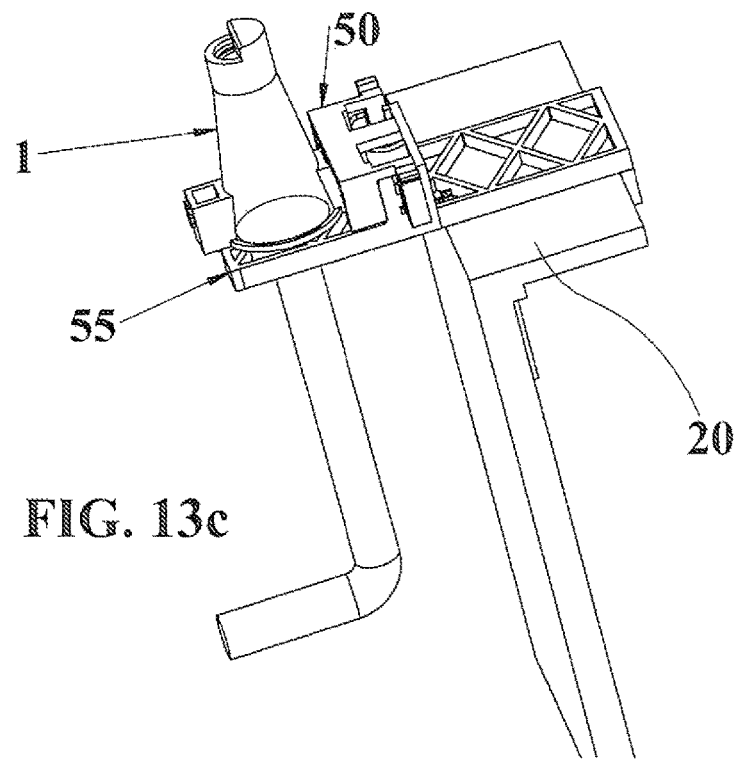
Figure 14A:
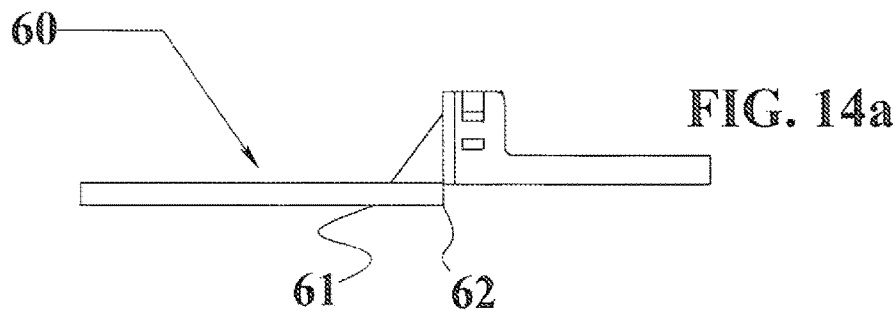
FIGS. 14a, 14b, 14c, 14d and 14e illustrate the ABS Wood Slider-R consisting of different views, designed with a receiver, which can be used on any wood foundation form when the concrete is poured to the top of the foundation form. It is reusable and it is identified with given functions as explained by the referenced numbered lead lines.
Figure 14B:
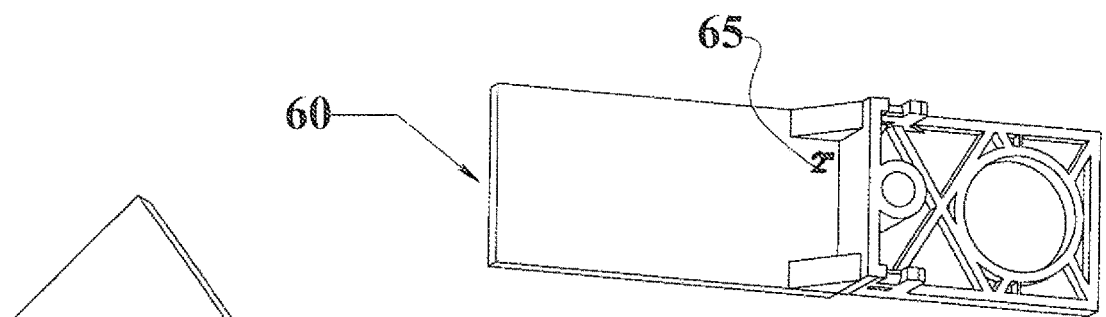
Figure 14C:
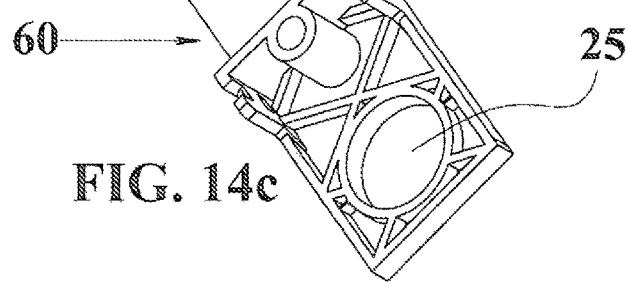
Figure 14D:
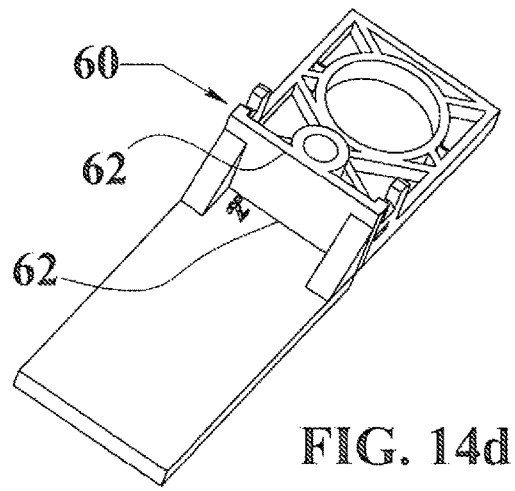
Figure 14E:
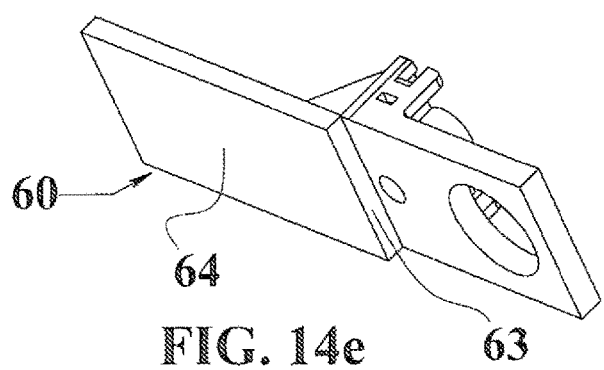

The ABS Steel Slider-R is shown in FIGS. 12*a* and 12*b*. Its receiver was demonstrated above as an example of all the receivers that correspond with any of the Sliders-R and or Elbow-R that have receivers. This ABS Steel Slider-R is designed for the industry standard steel framed foundation forms and is designed in the same manner as the ABS Steel Slider (FIGS. 3*a*, 3*b* and 3*c*). However, it does not have the 2 prongs, but it does have the receiver and the hole 11 has an opening in order to accommodate easy removal and FIGS. 12*a*, 12*b* and 12*c* show how it is used on a steel foundation form.

The ABS Wood Slider-R 60 (FIGS. 14*a*, 14*b*, 14*c* and 14*e*) is designed to be used on any kind of wood foundation forms when the concrete is poured to the top of such forms. The bottom part 61 of this Slider-R sits on top of the foundation form, it is then secured to the top of the form by nailing or stapling it down, it is placed so that the bottom edge 62 lines up with the edge of the inside foundation form. This Slider-R is designed to hold the anchor bolt so that there will be about ¼ inch space 63 between the top of the form and the bottom-upper side 64 of the Slider-R. The 2" marker 65, which is found on all the Sliders-R, indicates where to line up the edge 62 to the inside of the edge of any foundation form, so the anchor bolt will be 2" from the inside of any foundation form.

Figure 15A:
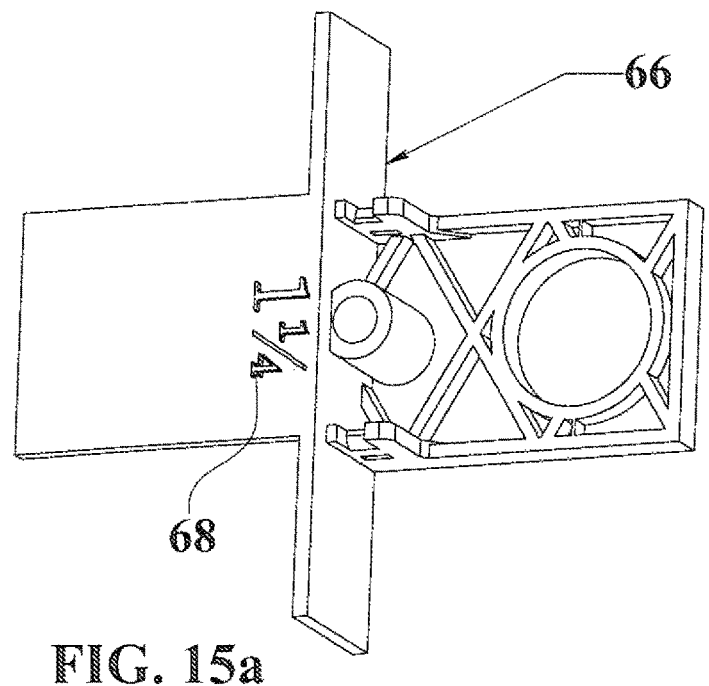
FIGS. 15a, 15b and 15c illustrate the ABS Universal Slider-R consisting of different views, designed with the receiver and used when concrete is poured to no more than 1½ inches from the top of any form. It is reusable and its functions is explained and identified by the referenced number lead lines.
Figure 15B:
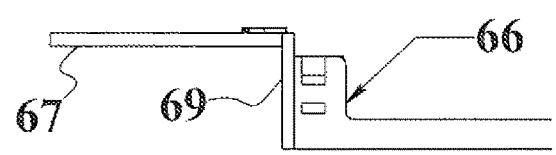
Figure 15C:
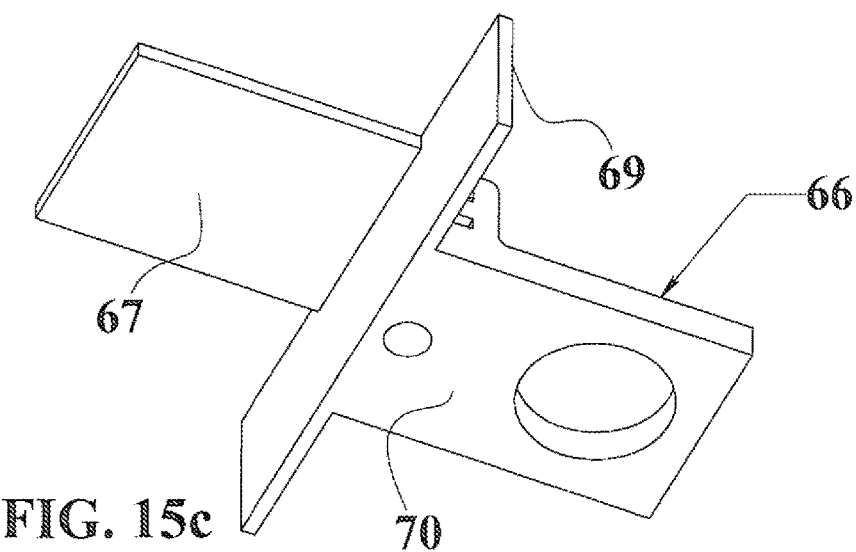
Figure 16A:
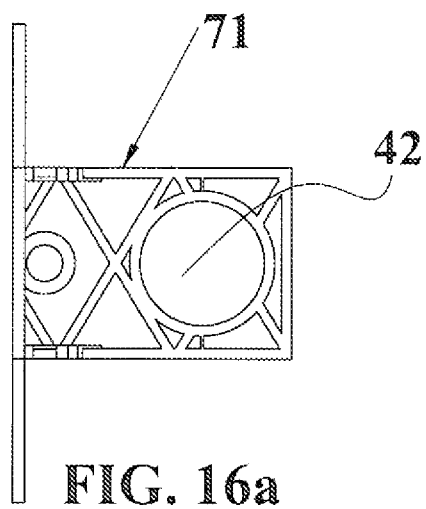
FIGS. 16a, 16b, 16c and 16d illustrate the ABS Elbow-R consisting of several different views, designed with the receiver and re-usable. It is identified with its functions as explained by the referenced numbered lead lines.
Figure 16B:
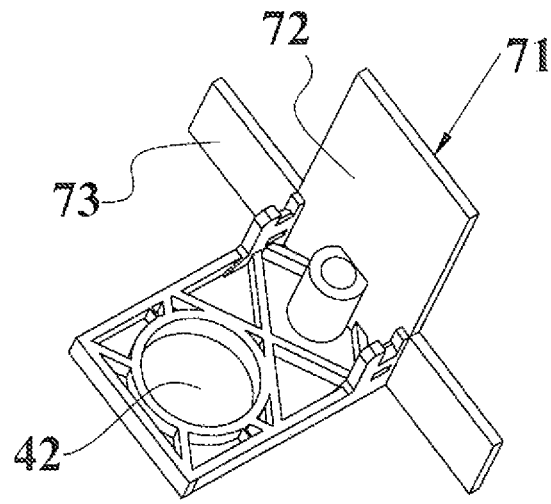
Figure 16C:
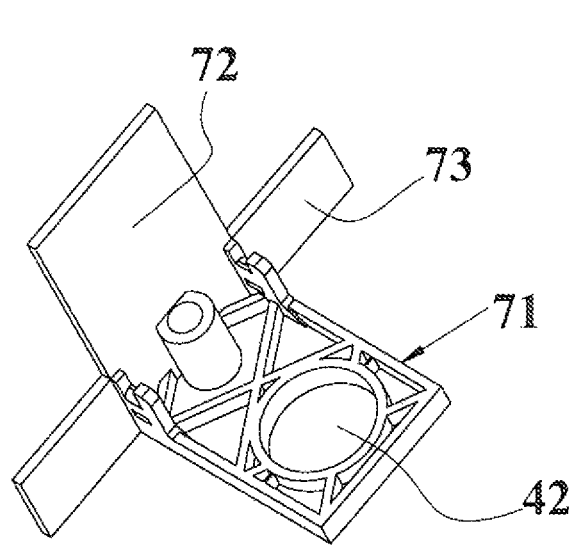
Figure 16D:
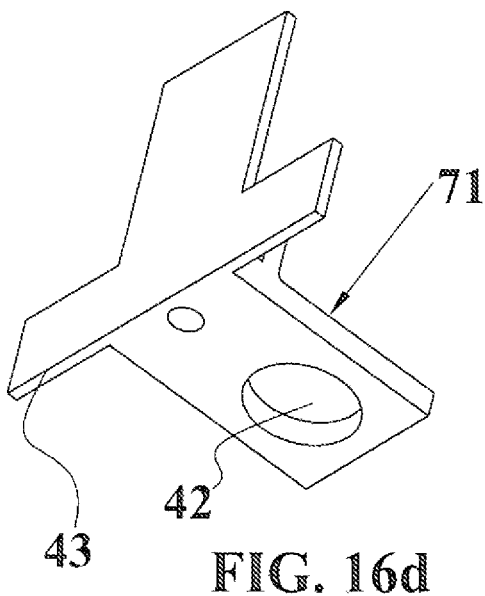

The ABS Universal Slider FIGS. 15*a*, 15*b* and 15*c* is designed to fit against any type of foundation form when the concrete is poured at 1½ inches from the top. On top the marking of 1¼ inch 68 indicates that the lower bottom part 70 of the Slider will be 1¼ inch 69 from the top of the foundation form, the upper bottom part 67 of the Slider sits on top of the foundation form and is where it is either nailed down or stapled down to secure it against the foundation form.

The ABS Elbow-R ("ER") 71 (FIGS. 16*a*, 16*b*, 16*c* and 16*d*) is designed in the same manner as the ABS Elbow as described above, but without the locking stems and with the receiver. The ABS Elbow-R is used when the concrete is not poured to the top of any type of foundation forms. It is secured to the form by placing nails or stables on the sides 73 or the upper wall 72. For proper alignment, the ER must be lined up by ensuring that the bottom of the sides 73 line perfectly with a properly placed chalk mark found on the inside outer wall of the foundation form.

A person with skills in the art will understand that the figures and discussion represent examples of practice of the invention and are not limiting to the scope of the invention.

The invention claimed is:

1. An Anchor Bolt Setting (ABS) system, comprising:
   a bolt cap adapted to securely hold an anchor bolt vertically by an upper threaded end with the anchor bolt suspended below the bolt cap, the bolt cap having a vertical axis, an upper cylindrical portion with a female threaded hole symmetrical about the vertical axis through the upper portion ending at a horizontal blocking shoulder, a medial portion in a conical shape below the upper cylindrical portion, the medial portion having an internal cavity with an inner diameter larger than the diameter of the female threaded hole, a cylindrical base portion having a base outside diameter, a base inside diameter larger than the female threaded hole of the upper cylindrical portion, a shoulder extending outward at an upper end of the cylindrical base portion, a lateral element extending horizontally to one side of the medial portion above the level of the shoulder of the base portion, and a vertically oriented opening having a rectangular cross section through the lateral element;
   an adapter having a length and a width, a form interface configured to engage an edge of a foundation form for concrete, a substantially planar portion extending over the foundation form from the edge, a first vertical cylindrical opening proximate an end of the adapter away from the form interface, the first opening having an inside diameter providing a slip fit for the base outside diameter of the cylindrical base portion, and a receiver structure implemented across the width of the adapter between the first vertical cylindrical opening and the form interface, the receiver structure having a second vertical cylindrical opening centered on the width of the adapter, a first vertical member at one edge of the width of the receiver structure with a first horizontal slot extending in the direction of the width, and a second vertical member at an opposite edge of the width of the receiver structure with a second horizontal slot extending in the direction of the width; and a lock down tie structure with a width greater than the width of the adapter, a centrally positioned round tongue having a diameter providing a slip fit to the second vertical cylindrical opening of the receiver structure, extending vertically downward, a centrally positioned rectangular tongue providing a slip fit to the vertically oriented opening having a rectangular cross section through the lateral element of the bolt cap, extending vertically downward, first and second horizontally extending prongs on flexible members on opposite sides of the lock down tie structure, adapted to span the receiver structure and to engage the horizontal slots on opposite edges of the receiver structure, and a base member having a bottom surface adapted to abut an upper surface of the adapter;

wherein adapter is engaged to the edge of the foundation form extending horizontally over the foundation form, the anchor bolt is threaded from below into the female threaded hole of the upper cylindrical portion of the bolt cap until bearing against the horizontal blocking shoulder, the bolt cap with the anchor bolt engaged is inserted by the cylindrical base portion into the first cylindrical opening of the adapter until the shoulder of the base portion encounters the adapter, presenting the anchor bolt downward into the foundation form, the lock down tie structure is placed over the receiver structure of the adapter with the centrally positioned round tongue engaging the second vertical cylindrical opening of the receiver structure, the centrally positioned rectangular tongue engaging the vertically oriented opening having a rectangular cross section through the lateral element of the bolt cap, the base member abutting the upper surface of the adapter, and the first and second horizontally extending prongs engaging the horizontal slots on opposite edges of the receiver structure, securely locking the bolt cap with the anchor bolt engaged to the adapter with the anchor bolt presented downward into the foundation form, and uncured concrete is poured into the foundation form, enveloping the anchor bolt.

2. The ABS system of claim 1 wherein the female threaded hole in the bolt cap has a thread size corresponding to a specific anchor bolt.

3. The ABS system of claim 2 wherein the thread size is specified on a surface of the bolt cap by indicia.

4. The ABS system of claim 1 wherein the foundation form is a steel foundation form having a horizontal lip facing outward from the form and the adapter has a slot shaped to slide over the lip of the steel foundation form, presenting the the substantially planar portion of the adapter horizontally over the steel foundation form.

5. The ABS system of claim 1 wherein the foundation form is a wooden foundation form, and the adapter is adapted to be nailed to the wooden foundation.

6. The ABS system of claim 1 wherein the adapter has a vertically oriented surface extending downward at a right angle from the substantially planar portion of the adapter, and the vertically oriented surface is secured to an inside vertical surface of the foundation form, for forms that are not filled to at or near the top of the form.

7. A method for setting an anchor bolt in poured concrete, comprising:

engaging an adapter having a substantially planar portion with a length and a width, a form interface configured to engage an edge of a foundation form for concrete, a first vertical cylindrical opening proximate an end of the adapter away from the form interface, the first vertical cylindrical opening having a first inside diameter, and a receiver structure implemented across the width of the adapter between the first vertical cylindrical opening and the form interface, the receiver structure having a second vertical cylindrical opening centered on the width of the adapter, a first vertical member at one edge of the width of the receiver structure with a first horizontal slot extending in the direction of the width, and a second vertical member at an opposite edge of the width of the receiver structure with a second horizontal slot extending in the direction of the width, to an edge of the foundation form such that the substantially planar portion of the adapter extends over the foundation form;

threading an anchor bolt from below into a female threaded hole of a bolt cap adapted to securely hold the anchor bolt vertically with the anchor bolt suspended below the bolt cap, the bolt cap having a vertical axis, an upper cylindrical portion having the female threaded hole symmetrical about the vertical axis through the upper portion, the female threaded hole ending at a horizontal blocking shoulder, the bolt cap having a medial portion in a conical shape below the upper cylindrical portion, the medial portion having an internal cavity with an inner diameter larger than the diameter of the female threaded hole, a cylindrical base portion having a base outside diameter, a base inside diameter larger than the female threaded hole of the upper cylindrical portion, a shoulder extending outward at an upper end of the cylindrical base portion, a lateral element extending horizontally to one side of the medial portion above the level of the shoulder of the base portion, and a vertically oriented opening having a rectangular cross section through the lateral element;

placing the bolt cap with the anchor bolt engaged against the horizontal blocking shoulder, by the cylindrical base portion of the bolt cap engaging the first vertical cylindrical opening of the adapter until the shoulder at the upper end of the base portion of the bolt cap meets the adapter;

positioning a lock down tie structure over the receiver structure and the bolt cap, the lock down tie structure having a width greater than the width of the adapter, a centrally positioned round tongue having a diameter providing a slip fit to the second vertical cylindrical opening of the receiver structure, extending vertically downward, a centrally positioned rectangular tongue providing a slip fit to the vertically oriented opening having a rectangular cross section through the lateral element of the bolt cap, extending vertically downward, first and second horizontally extending prongs on flexible members on opposite sides of the lock down tie structure, adapted to span the receiver structure and to engage the horizontal slots on opposite edges of the receiver structure, and a base member having a bottom surface adapted to abut an upper surface of the adapter;

urging the lock down tie structure downward such that the centrally positioned round tongue engages the second vertical cylindrical opening of the receiver structure, the centrally positioned rectangular tongue engages the vertically oriented opening having a rectangular cross section through the lateral element of the bolt cap, and the first and second horizontally extending prongs on the flexible members on opposite sides of the lock down tie structure, engage the horizontal slots on opposite edges of the receiver structure, and the base member of the lock down tie structure abuts the upper surface of the adapter, securing the bolt cap to the adapter; and pouring wet concrete into the foundation form, enveloping a lower portion of the anchor bolt.

8. The method of claim 7 wherein the foundation form is a steel foundation form having a horizontal lip facing outward from the form, and the adapter has a slot shaped to slide over the horizontal lip of the steel foundation form, presenting the substantially planar extension horizontally over the foundation form.

9. The method of claim 7 wherein the foundation form is a wooden foundation form, and the adapter is adapted to be nailed to a lip of the wooden foundation form.

10. The method of claim 7 wherein the adapter has a vertically oriented surface extending downward at a right angle from the substantially planar portion of the adapter, and the vertically oriented surface is secured to an inside vertical surface of the foundation form, for forms that are not filled to at or near the top of the form.

\* \* \* \* \*